United States Patent
Zhu

(10) Patent No.: US 11,809,855 B2
(45) Date of Patent: *Nov. 7, 2023

(54) SOFTWARE UPGRADE MANAGEMENT METHOD, SERVER, TERMINAL, APPARATUS, AND STORAGE MEDIUM

(71) Applicant: Huawei Cloud Computing Technologies Co., Ltd., Guizhou (CN)

(72) Inventor: Jintao Zhu, Xi'an (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,132

(22) Filed: Mar. 29, 2023

(65) Prior Publication Data

US 2023/0236823 A1   Jul. 27, 2023

Related U.S. Application Data

(63) Continuation of application No. 16/990,512, filed on Aug. 11, 2020, now Pat. No. 11,645,063, which is a
(Continued)

(30) Foreign Application Priority Data

Feb. 12, 2018   (CN) .......................... 201810146366.8

(51) Int. Cl.
*G06F 8/65*      (2018.01)
*G06F 9/48*      (2006.01)
(Continued)

(52) U.S. Cl.
CPC .............. *G06F 8/65* (2013.01); *G06F 9/4881* (2013.01); *G06F 9/54* (2013.01); *H04L 67/10* (2013.01); *H04L 67/61* (2022.05)

(58) Field of Classification Search
None
See application file for complete search history.

(56) References Cited

U.S. PATENT DOCUMENTS 6,820,259 B1    11/2004   Kawamata et al.
2003/0204841 A1  10/2003  Nakane et al.
(Continued)

FOREIGN PATENT DOCUMENTS

CN    101540980 A    9/2009
CN    101841456 A    9/2010
(Continued)

OTHER PUBLICATIONS

RFC 8240, Tschofenig, H., "Report from the Internet of Things Software Update (IoTSU) Workshop 2016," Internet Architecture Board (IAB), Sep. 2017, 27 pages.

*Primary Examiner* — Philip Wang
(74) *Attorney, Agent, or Firm* — Conley Rose, P.C.

(57) ABSTRACT

A software upgrade management method for an unmanned and automated scheduling of an upgrade includes obtaining, by a server, an upgrade package, determining, by the server, a target upgrade mode for a terminal, where the target upgrade mode includes one of a server-determined upgrade mode, a terminal-determined upgrade mode, or a negotiated upgrade mode, and sending, by the server, the upgrade package to the terminal and performing, based on the target upgrade mode, a software upgrade procedure of the terminal.

20 Claims, 10 Drawing Sheets

Related U.S. Application Data continuation of application No. PCT/CN2019/073597, filed on Jan. 29, 2019.

(51) Int. Cl.
  *G06F 9/54* (2006.01)
  *H04L 67/10* (2022.01)
  *H04L 67/61* (2022.01)

(56) References Cited

U.S. PATENT DOCUMENTS

| | | |
|---|---|---|
| 2007/0006216 A1 | 1/2007 | Nakane et al. |
| 2008/0184219 A1 | 7/2008 | Matsumoto |
| 2012/0005676 A1 | 1/2012 | Nakajima |
| 2012/0042059 A1 | 2/2012 | Tian et al. |
| 2015/0007157 A1 | 1/2015 | Park et al. |
| 2015/0154016 A1 | 6/2015 | Liang et al. |
| 2016/0291959 A1 | 10/2016 | Douglas et al. |
| 2016/0294614 A1 | 10/2016 | Searle et al. |
| 2016/0306616 A1 | 10/2016 | Tomppo |
| 2016/0342410 A1 | 11/2016 | Wu et al. |
| 2017/0230713 A1 | 8/2017 | Sun |
| 2017/0286087 A1 | 10/2017 | Naota |
| 2020/0272450 A1 | 8/2020 | Inoue et al. |
| 2020/0356354 A1 | 11/2020 | Mitra |
| 2020/0379749 A1 | 12/2020 | Zhu |

FOREIGN PATENT DOCUMENTS

| | | |
|---|---|---|
| CN | 101854623 A | 10/2010 |
| CN | 102799447 A | 11/2012 |
| CN | 104363579 A | 2/2015 |
| CN | 104518904 A | 4/2015 |
| CN | 104850416 A | 8/2015 |
| CN | 106533744 A | 3/2017 |
| CN | 106572372 A | 4/2017 |
| CN | 106648725 A | 5/2017 |
| CN | 106789863 A | 5/2017 |
| JP | 2003323300 A | 11/2003 |
| JP | 2009211269 A | 9/2009 |
| JP | 2013081158 A | 5/2013 |
| JP | 2014006678 A | 1/2014 |
| JP | 2015038644 A | 2/2015 |
| JP | 2017045302 A | 3/2017 |
| JP | 2017524212 A | 8/2017 |
| KR | 20000047269 A | 7/2000 |
| KR | 101349603 B1 | 1/2014 |
| KR | 101401006 B1 | 5/2014 |

SOFTWARE UPGRADE MANAGEMENT METHOD, SERVER, TERMINAL, APPARATUS, AND STORAGE MEDIUM

CROSS-REFERENCE TO RELATED APPLICATIONS

This is a continuation of U.S. patent application Ser. No. 16/990,512 filed on Aug. 11, 2020, which is a continuation of International Patent Application No. PCT/CN2019/073597 filed on Jan. 29, 2019, which claims priority to Chinese Patent Application No. 201810146366.8 filed on Feb. 12, 2018. All of the aforementioned applications are hereby incorporated by reference in their entireties.

TECHNICAL FIELD

This application relates to the field of Internet of Things technologies, and in particular, to a software upgrade management method, a server, a terminal, an apparatus, and a storage medium.

BACKGROUND

In the Internet of Things, a software upgrade of an Internet of Things device is dependent on professional personnel for manual decision-making and a manual upgrade. In addition, before a software upgrade procedure is started, no decision is made about whether service status information in the Internet of Things device satisfies an upgrade condition. Instead, the software upgrade procedure is started directly. If a current upgrade package is of a function type or a configuration type, and an important service (for example, a security service) in a non-idle state is deployed in the Internet of Things device, directly starting the software upgrade procedure may result in an interruption to an ongoing important service in the Internet of Things device.

SUMMARY

This application provides a software upgrade management method, a server, a terminal, an apparatus, and a storage medium, which can resolve a problem in other approaches that a service in an Internet of Things device is interrupted when a software upgrade is performed on the Internet of Things device.

A first aspect of this application provides a software upgrade management method, where the method may include the following steps.

A server obtains an upgrade package and determines a target upgrade mode for a terminal, where the target upgrade mode includes one of a server-decided upgrade mode, a terminal-decided upgrade mode, or a negotiated upgrade mode.

The server sends the upgrade package to the terminal and performs, based on the target upgrade mode, a software upgrade procedure of the terminal.

Compared with an existing mechanism, in this application, after determining the target upgrade mode, the server automatically performs the software upgrade procedure based on the determined target upgrade mode, thereby implementing unmanned and automated scheduling of an upgrade.

Based on the first aspect, in a first implementation of the first aspect, the performing, based on the target upgrade mode, a software upgrade procedure of the terminal includes the following steps.

In the target upgrade mode, the server performs the software upgrade procedure of the terminal based on at least one of an upgrade package type, an upgrade package priority, or service status information of a service in the terminal, where the service status information includes at least one of a service status and a service priority.

Based on the first implementation of the first aspect, in a second implementation of the first aspect, when the target upgrade mode is the server-decided upgrade mode, that in the target upgrade mode, the server performs the software upgrade procedure of the terminal based on at least one of an upgrade package type, an upgrade package priority, or service status information of a service in the terminal includes the following steps.

The server obtains the service status of the service in the terminal from the service status information.

When determining that the service status of the terminal is an idle state or a non-upgrade state, the server sends indication information to the terminal, where the indication information is used to instruct the terminal to stop the service within a preset time. For example, when the service status is the idle state, the preset time may be 0 or a relatively short time interval, and the server may immediately send the indication information to the terminal. When the service status is the non-upgrade state, the preset time may be 0 or a relatively short time interval, and the server may also send the indication information to the terminal. A value of the preset time is not limited in this application.

The server starts the software upgrade procedure after receiving an acknowledgment response from the terminal.

Based on the first implementation of the first aspect, in a third implementation of the first aspect, when the target upgrade mode is the server-decided upgrade mode, that in the target upgrade mode, the server performs the software upgrade procedure of the terminal based on at least one of an upgrade package type, an upgrade package priority, or service status information of a service in the terminal includes the following steps.

The server obtains the service status of the service in the terminal from the service status information.

When the upgrade package type is a predefined type and the service status is a non-upgrade state, the server sends indication information to the terminal, where the indication information is used to instruct the terminal to stop the service.

The server starts the software upgrade procedure after receiving an acknowledgment response from the terminal.

The predefined type may be a security type. When the upgrade package type is the security type and the service status is the non-upgrade state, the server may instruct the terminal to stop the service, to start the software upgrade procedure.

In some implementations, when the upgrade package type is the predefined type and the service status is an idle state, the server sends indication information to the terminal, where the indication information is used to instruct the terminal to stop the service within a preset time. For the preset time, refer to the description in the second implementation of the first aspect.

In some implementations, the server may alternatively determine, based on only the upgrade package type, whether to send information that instructs a terminal device to stop the service. For example, when the upgrade package type is the security type, the server may directly send indication information to the terminal, and start the software upgrade procedure after receiving an acknowledgement response returned by the terminal.

Based on the third implementation of the first aspect, in a fourth implementation of the first aspect, the indication information may include a first time or a predefined identifier. The first time is a response time during which the terminal stops the service and performs the software upgrade procedure. The predefined identifier is used to instruct the terminal to stop the service when the terminal receives the indication information.

For example, when the upgrade package type is the security type and the service status is the non-upgrade state, the server may indicate 10 seconds to the terminal, to instruct the terminal to stop the service within 10 seconds and start the software upgrade procedure after 10 seconds.

For another example, when the upgrade package type is the security type and the service status is the non-upgrade state, the server may indicate the predefined identifier to the terminal, to instruct the terminal to stop the service immediately after the terminal receives the predefined identifier and start the software upgrade procedure.

It can be learned that automated scheduling of the software upgrade procedure can be implemented using the indication information, and manual intervention is not required.

Based on the first implementation of the first aspect, in a fifth implementation of the first aspect, when the target upgrade mode is the server-decided upgrade mode, that in the target upgrade mode, the server performs the software upgrade procedure of the terminal based on at least one of an upgrade package type, an upgrade package priority, or service status information of a service in the terminal includes the following steps.

The server obtains the service priority of the service in the terminal from the service status information.

The server sends indication information to the terminal when determining that the upgrade package priority is higher than the service priority, where the indication information is used to instruct the terminal to stop the service.

The server starts the software upgrade procedure after receiving an acknowledgment response from the terminal.

It can be learned that importance of the upgrade package is considered by comparing the upgrade package priority with the service priority. This avoids a conflict between the upgrade procedure of the terminal and the service in the terminal.

Based on the first implementation of the first aspect, in a sixth implementation of the first aspect, when the target upgrade mode is the server-decided upgrade mode, that in the target upgrade mode, the server performs the software upgrade procedure of the terminal based on at least one of an upgrade package type, an upgrade package priority, or service status information of a service in the terminal includes the following steps.

The server obtains the service priority and the service status of the service in the terminal from the service status information.

The server sends indication information to the terminal when determining that the upgrade package priority is higher than the service priority and the service status is an idle state, where the indication information is used to instruct the terminal to stop the service.

The server starts the software upgrade procedure after receiving an acknowledgment response from the terminal.

In some implementations, after obtaining the service priority and the service status, the server sends indication information to the terminal when determining that the upgrade package priority is higher than the service priority and the service status is a non-upgrade state. The indication information is used to instruct the terminal to stop the service within a preset time. It can be learned that, in this case, an occasion for starting the software upgrade procedure is determined by considering the service priority, the upgrade package priority, and the service status. This can avoid a service interruption caused by directly starting the upgrade procedure by only considering a difference between the service priority and the upgrade package priority.

Based on the first implementation of the first aspect, in a seventh implementation of the first aspect, when the target upgrade mode is the server-decided upgrade mode, that in the target upgrade mode, the server performs the software upgrade procedure of the terminal based on at least one of an upgrade package type, an upgrade package priority, or service status information of a service in the terminal includes the following steps.

The server obtains the service priority and the service status of the service in the terminal from the service status information.

The server sends indication information to the terminal when determining that the upgrade package priority is higher than the service priority, the upgrade package type is a non-predefined type, and the service status is an idle state or a non-upgrade state, where the indication information is used to instruct the terminal to stop the service.

The server starts the software upgrade procedure after receiving an acknowledgment response from the terminal.

It can be learned that an occasion for starting the software upgrade procedure is determined by considering the service priority, the upgrade package priority, the upgrade package type, and the service status. This can further enhance determining of an occasion for starting the software upgrade procedure and can achieve scheduling at a finer granularity.

Based on the first implementation of the first aspect, in an eighth implementation of the first aspect, when the target upgrade mode is the server-decided upgrade mode, that in the target upgrade mode, the server performs the software upgrade procedure of the terminal based on at least one of an upgrade package type, an upgrade package priority, or service status information of a service in the terminal includes the following steps.

The server obtains the service priority and the service status of the service in the terminal from the service status information.

The server sends indication information used to instruct the terminal to stop the service to the terminal when determining that the upgrade package priority is not higher than the service priority and the service status is an idle state or a non-upgrade state.

The server starts the software upgrade procedure after receiving an acknowledgment response from the terminal.

It can be learned that an optimal occasion does not arise for starting the software upgrade procedure at a time when the upgrade package priority is not higher than the service priority. The server may obtain in real time an update of the service status of the terminal, and then determine, based on an updated service status obtained each time, whether an occasion arises for starting the software upgrade procedure. When the updated service status obtained by the server is idle, the server may instruct the terminal to stop the service, to perform the software upgrade procedure. Alternatively, when the updated service status obtained by the server is the non-upgrade state, the server may instruct the terminal to stop the service or stop the service within a preset time. Through dynamic comparison and judgment, the server can implement automated scheduling of an upgrade. This avoids that the software upgrade procedure is not started when it is determined that the upgrade package priority is not higher than the service priority.

Based on the first aspect, in a ninth implementation of the first aspect, when the target upgrade mode is the terminal-decided upgrade mode, the performing, based on the target upgrade mode, a software upgrade procedure of the terminal includes the following steps.

The server sends the upgrade package priority to the terminal, where the upgrade package priority is used by the terminal to determine, based on the upgrade package priority and the service priority, whether to start the software upgrade procedure.

After receiving an upgrade request from the terminal, the server agrees to the upgrade request and performs the software upgrade procedure of the terminal.

It can be learned that, in the terminal-decided upgrade mode, the server provides the terminal with the upgrade package priority, to provide a basis for the terminal to determine whether to start the software upgrade procedure.

Based on the first aspect, in a tenth implementation of the first aspect, when the target upgrade mode is the negotiated upgrade mode, the performing, based on the target upgrade mode, a software upgrade procedure of the terminal includes the following steps.

The server sends the upgrade package priority to the terminal, where the upgrade package priority is used by the terminal to determine, based on the upgrade package priority and the service status, whether to start the software upgrade procedure.

The server receives an acknowledgment response carrying waiting duration from the terminal.

The server starts the software upgrade procedure of the terminal after timing duration exceeds the waiting duration.

It can be learned that, in the negotiated upgrade mode, the server provides the terminal with the upgrade package priority, to provide a basis for the terminal to determine whether to start the software upgrade procedure. In addition, the server automatically starts, based on the waiting duration returned by the terminal, the software upgrade procedure, and the terminal does not need to initiate an upgrade request again. This implementation is particularly applicable to a scenario in which ending or interrupting a current service in the terminal is inappropriate.

Based on the first implementation of the first aspect, in an eleventh implementation of the first aspect, the method further includes the following steps.

The server obtains the upgrade package priority in at least one of the following manners the server obtains the upgrade package priority from metadata of the upgrade package, or the server obtains the upgrade package priority from a description file of the upgrade package, or the server obtains the upgrade package priority from a provider of the upgrade package, or the server determines, according to a local policy, the upgrade package priority.

A second aspect of this application provides a software upgrade management method, where the method includes the following steps.

A terminal sends an upgrade mode configured in the terminal to a server, where the upgrade mode configured in the terminal is used by the server to determine a target upgrade mode for the terminal, and the target upgrade mode includes one of a server-decided upgrade mode, a terminal-decided upgrade mode, or a negotiated upgrade mode.

The terminal obtains an upgrade package from the server, and performs, based on the target upgrade mode, a software upgrade procedure of the terminal.

Compared with an existing mechanism, the terminal in this application provides the server with the configured upgrade mode, to provide a basis for the server to determine the target upgrade mode such that the software upgrade procedure can be automatically performed based on the target upgrade mode determined by the server, thereby implementing unmanned and automated scheduling of an upgrade.

Based on the second aspect, in a first implementation of the second aspect, when the target upgrade mode is the terminal-decided upgrade mode, the performing based on the target upgrade mode, a software upgrade procedure of the terminal includes the following steps.

The terminal obtains an upgrade package priority from the server, and sends an upgrade request to the server after determining, based on the upgrade package priority and a service priority of a service in the terminal, to start the software upgrade procedure.

After receiving an acknowledgment response from the server, the terminal obtains the upgrade package from the server and starts the software upgrade procedure.

Based on the second aspect, in a second implementation of the second aspect, when the target upgrade mode is a negotiation upgrade mode, the performing, based on the target upgrade mode, a software upgrade procedure of the terminal includes the following steps.

The terminal obtains an upgrade package priority from the server, and sends an acknowledgment response carrying waiting duration to the server after determining based on the upgrade package priority, and a service priority and a service status of a service in the terminal, the waiting duration for starting the software upgrade procedure.

After timing duration exceeds the waiting duration, the terminal obtains the upgrade package from the server and performs the software upgrade procedure.

Based on the second aspect, in a first implementation of the second aspect, when the target upgrade mode is the server-decided upgrade mode, the performing, based on the target upgrade mode, a software upgrade procedure of the terminal includes the following steps.

The terminal sends service status information of a service in the terminal to the server, where the service status information is used by the server to determine at least one of a service priority or a service status of the service in the terminal.

After receiving, from the server, indication information used to instruct the terminal to stop the service, the terminal obtains the upgrade package from the server and performs the software upgrade procedure of the terminal.

A third aspect of this application provides a server that has a function of implementing a method corresponding to the software upgrade management method provided in the first aspect. The function may be implemented by hardware, or implemented by hardware executing corresponding software. The hardware or the software includes one or more modules corresponding to the foregoing function, and the module may be software and/or hardware.

In some implementations, the server includes a transceiver module configured to obtain an upgrade package, and a processing module configured to determine a target upgrade mode for a terminal, where the target upgrade mode includes one of a server-decided upgrade mode, a terminal-decided upgrade mode, or a negotiated upgrade mode, and send, using the transceiver module, the upgrade package to the terminal, and perform a software upgrade procedure of the terminal based on the target upgrade mode.

In some implementations, the processing module includes the following steps.

In the target upgrade mode, the server performs the software upgrade procedure of the terminal based on at least one of an upgrade package type, an upgrade package priority, or service status information of a service in the terminal, where the service status information includes at least one of a service status and a service priority.

In some implementations, when the target upgrade mode is the server-decided upgrade mode, the processing module is configured to obtain, using the transceiver module, the service status of the service in the terminal from the service status information, send, using the transceiver module, indication information to the terminal when determining that the service status of the terminal is an idle state or a non-upgrade state, where the indication information is used to instruct the terminal to stop the service within a preset time, and start the software upgrade procedure after the transceiver module receives an acknowledgment response from the terminal.

In some implementations, when the target upgrade mode is the server-decided upgrade mode, the processing module is configured to obtain, using the transceiver module, the service status of the service in the terminal from the service status information, send, using the transceiver module, indication information to the terminal when the upgrade package type is a predefined type and the service status is a non-upgrade state, where the indication information is used to instruct the terminal to stop the service, and start the software upgrade procedure after the transceiver module receives an acknowledgment response from the terminal.

In some implementations, the indication information includes a first time or a predefined identifier. The first time is a response time during which the terminal stops the service and performs the software upgrade procedure. The predefined identifier is used to instruct the terminal to stop the service when the terminal receives the indication information.

In some implementations, when the target upgrade mode is the server-decided upgrade mode, the processing module is configured to obtain, using the transceiver module, the service priority of the service in the terminal from the service status information, send, using the transceiver module, indication information to the terminal when determining that the upgrade package priority is higher than the service priority, where the indication information is used to instruct the terminal to stop the service, and start the software upgrade procedure after the transceiver module receives an acknowledgment response from the terminal.

In some implementations, when the target upgrade mode is the server-decided upgrade mode, the processing module is configured to obtain, using the transceiver module, the service priority and the service status of the service in the terminal from the service status information, send, using the transceiver module, indication information to the terminal when determining that the upgrade package priority is higher than the service priority and the service status is an idle state, where the indication information is used to instruct the terminal to stop the service, and start the software upgrade procedure after the transceiver module receives an acknowledgment response from the terminal.

In some implementations, when the target upgrade mode is the server-decided upgrade mode, the processing module is configured to obtain, using the transceiver module, the service priority and the service status of the service in the terminal from the service status information, send, using the transceiver module, indication information to the terminal when determining that the upgrade package priority is higher than the service priority, the upgrade package type is a non-predefined type, and the service status is an idle state or a non-upgrade state, where the indication information is used to instruct the terminal to stop the service, and start the software upgrade procedure after the transceiver module receives an acknowledgment response from the terminal.

In some implementations, when the target upgrade mode is the server-decided upgrade mode, the processing module is configured to obtain, using the transceiver module, the service priority and the service status of the service in the terminal from the service status information, send, using the transceiver module, indication information used to instruct the terminal to stop the service to the terminal when determining that the upgrade package priority is not higher than the service priority and the service status is an idle state or a non-upgrade state, and start the software upgrade procedure after the transceiver module receives an acknowledgment response from the terminal.

In some implementations, when the target upgrade mode is the terminal-decided upgrade mode, the processing module is configured to send, using the transceiver module, the upgrade package priority to the terminal, where the upgrade package priority is used by the terminal to determine whether to start the software upgrade procedure based on the upgrade package priority and the service priority, and after the transceiver module receives an upgrade request from the terminal, agree to the upgrade request and perform the software upgrade procedure of the terminal.

In some implementations, when the target upgrade mode is the negotiated upgrade mode, the processing module is configured to send, using the transceiver module, the upgrade package priority to the terminal, where the upgrade package priority is used by the terminal to determine whether to start the software upgrade procedure based on the upgrade package priority and the service status, receive, using the transceiver module, an acknowledgment response carrying waiting duration from the terminal, and start the software upgrade procedure of the terminal after timing duration exceeds the waiting duration.

A fourth aspect of this application provides a terminal that has a function of implementing a method corresponding to the software upgrade management method provided in the second aspect. The function may be implemented by hardware, or implemented by hardware executing corresponding software. The hardware or the software includes one or more modules corresponding to the foregoing function, and the module may be software and/or hardware.

In some implementations, the terminal includes a transceiver module configured to send an upgrade mode configured in the terminal to a server, where the upgrade mode configured in the terminal is used by the server to determine a target upgrade mode for the terminal, and the target upgrade mode includes one of a server-decided upgrade mode, a terminal-decided upgrade mode, or a negotiated upgrade mode, and a processing module configured to perform a software upgrade procedure of the terminal based on the target upgrade mode after the transceiver module obtains an upgrade package from the server.

In some implementations, when the target upgrade mode is the terminal-decided upgrade mode, the processing module is configured to obtain, using the transceiver module, an upgrade package priority from the server, send, using the transceiver module, an upgrade request to the server after determining to start the software upgrade procedure based on the upgrade package priority and a service priority of a service in the terminal, and after the transceiver module receives an acknowledgment response from the server, obtain the upgrade package from the server and start the software upgrade procedure.

In some implementations, when the target upgrade mode is a negotiation upgrade mode, the processing module is configured to obtain, using the transceiver module, an upgrade package priority from the server, send, using the transceiver module, an acknowledgment response carrying waiting duration to the server after determining the waiting duration for starting the software upgrade procedure based on the upgrade package priority, and a service priority and a service status of a service in the terminal, and after timing duration exceeds the waiting duration, obtain, using the transceiver module, the upgrade package from the server and perform the software upgrade procedure.

In some implementations, when the target upgrade mode is the server-decided upgrade mode, the processing module is configured to send, using the transceiver module, service status information of a service in the terminal to the server, where the service status information is used by the server to determine at least one of a service priority or a service status of the service in the terminal, and after the transceiver module receives, from the server, indication information used to instruct the terminal to stop the service, obtain, using the transceiver module, the upgrade package from the server and perform the software upgrade procedure of the terminal.

Still another aspect of this application provides a computer apparatus including at least one connected processor, memory, transmitter, and receiver, where the memory is configured to store program code, and the processor is configured to invoke the program code in the memory to perform the operations performed by the server in the foregoing aspects or the operations performed by the terminal in the foregoing aspects.

Still another aspect of this application provides a computer apparatus, and the computer apparatus includes at least one processor, at least one memory, and at least one transceiver, where the memory is configured to store program code, and the processor is configured to invoke the program code in the memory to perform the operation performed by the server in the first aspect or the operation performed by the terminal in the second aspect.

The transceiver may also be replaced with a receiver and a transmitter, and the receiver and the transmitter may be a same physical entity or different physical entities. When being the same physical entity, the receiver and the transmitter may be collectively referred to as a transceiver. The memory may be integrated into the processor, or may be separate from the processor.

Still another aspect of this application provides a computer storage medium including an instruction. When the instruction runs on a computer, the computer is enabled to perform the operation in the first aspect or the operation in the second aspect.

Still another aspect of this application provides a computer program product including an instruction. When the computer program product runs on a computer, the computer is enabled to perform the operation performed by the server in the first aspect or the operation performed by the terminal in the second aspect.

DESCRIPTION OF EMBODIMENTS

In the specification, claims, and accompanying drawings of this application, the terms "first", "second", and the like are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. In addition, the terms "include", "have", or any other variant thereof are intended to cover non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this application is merely logical division, and there may be another division during implementation in an embodiment. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another form, and this is not limited in this application. In addition, modules or sub-modules described as separate parts may be or may not be physically separated, or may be or may not be physical modules, or may be distributed on a plurality of circuit modules. Objectives of the solutions of this application may be achieved by selecting some or all of the modules according to actual requirements.

This application provides a software upgrade management method, a server, a terminal, an apparatus, and a storage medium, and may be applied to the field of Internet of Things technologies. The following describes devices in this application based on an architectural diagram of an Internet of Things system shown in FIG. 1.

Figure 1:
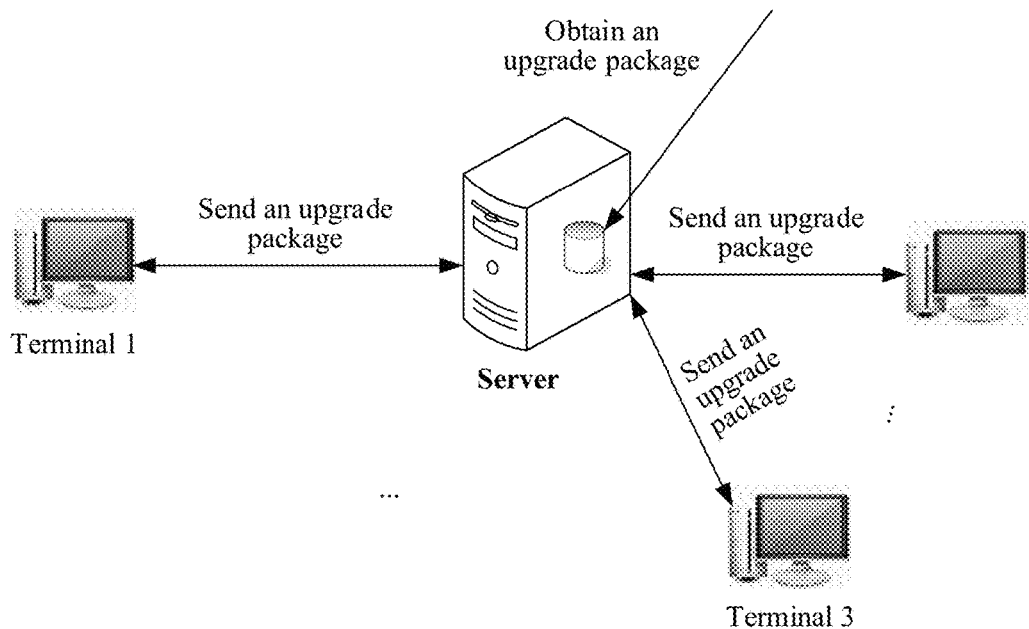
FIG. 1 is a schematic architectural diagram of an Internet of Things system according to an embodiment of this application.

In FIG. 1, the Internet of Things system includes a server and a plurality of terminals. A same service may be deployed in each terminal or different services may be separately deployed in each terminal, and at least one service may also be deployed in each terminal.

The server is configured to perform cluster management on these terminals, and cluster division may be performed on these terminals based on a type of a deployed service. After obtaining an upgrade packet, the server may first initiate a subscription request to each to-be-upgraded terminal to avoid an interruption to a service in the to-be-upgraded terminal. The subscription request is used to subscribe to service status information of the terminal, and the service status information may include an idle state or a non-upgrade state of the service, and may further include service-related information such as a service type and a service priority.

After determining a target upgrade mode for the terminal, the server may determine, based on information such as the subscribed service status information, an upgrade package priority and an upgrade package type, an occasion for performing a software upgrade procedure of the terminal.

In addition, the terminal may alternatively determine, based on information provided by the server, such as an upgrade package priority and an upgrade package type, an occasion for performing a software upgrade procedure of the terminal. For terminals that are to be upgraded based on a same type of upgrade package, software upgrade procedures of the terminals may be performed by the terminals at different occasions. Further, a decision may be made by the server or the to-be-upgraded terminal, provided that the software upgrade procedure is performed in a selected target upgrade mode.

To resolve the foregoing technical problem, this application provides the following technical solutions.

Based on a plurality of preconfigured upgrade modes, the server uses different software upgrade procedures in different scenarios. For example, when a software upgrade procedure is to be started, the server may determine an occasion for starting the software upgrade procedure from a plurality of dimensions such as an upgrade package type, an upgrade package priority, and service status information. For example, an automated upgrade of terminals in batches is implemented by comparing an upgrade package priority with a service priority of the terminal in a software upgrade procedure.

Figure 2:
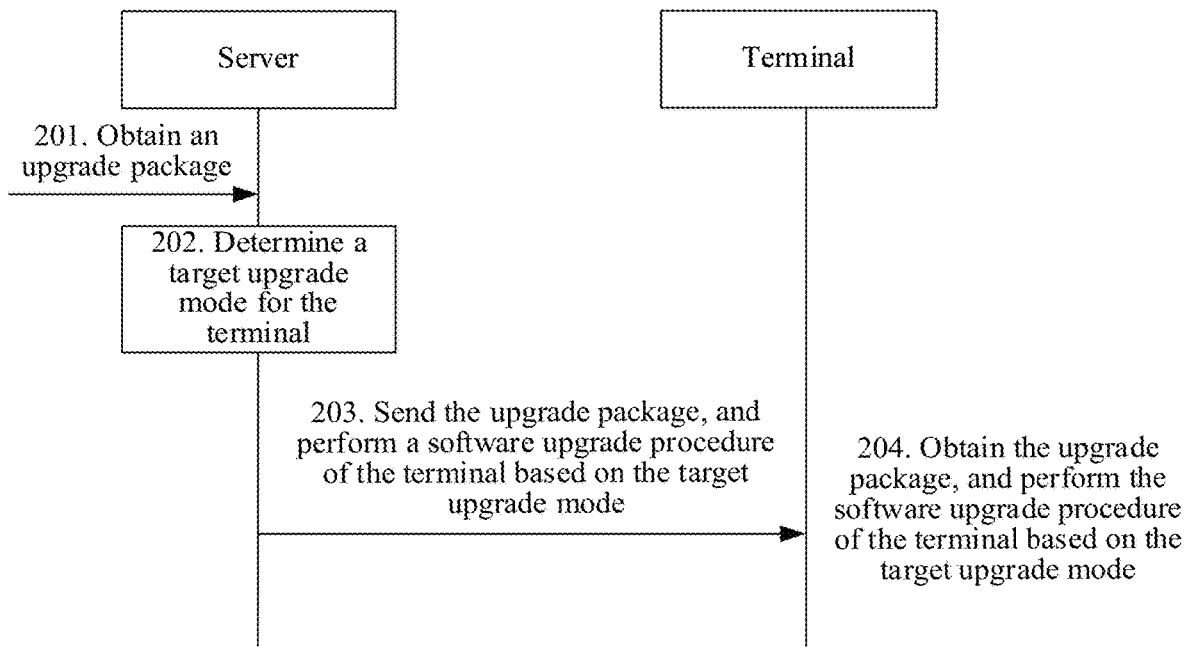
FIG. 2 is a schematic flowchart of a software upgrade management method according to an embodiment of this application.

FIG. 2 describes a software upgrade management method provided in this application. The method mainly includes the following steps.

201. The server obtains an upgrade package.

The upgrade package may include at least one type of upgrade package, for example, an upgrade package of a security type, a function type, a configuration type, or a general type. The upgrade package may include an executable script, executable code, and the like. The upgrade package may be an upgrade package for a system of a terminal or a service deployed in the terminal. This is not specifically limited in this application. In this embodiment of this application, the server may perform a software upgrade procedure for a system or a service of the terminal separately, or perform software upgrade procedures for the system and the service simultaneously.

In some implementations, the server may further obtain upgrade package priority information and then determine, based on priority information, an upgrade package priority, where the priority information may explicitly or implicitly indicate the upgrade package priority. The server obtains the upgrade package priority in at least one of the following manners the server obtains the upgrade package priority from metadata of the upgrade package, or the server obtains the upgrade package priority from a description file of the upgrade package, or the server obtains the upgrade package priority from a provider of the upgrade package, or the server determines, according to a local policy, the upgrade package priority.

In some implementations, if there are at least two types of upgrade packages obtained by the server, that the server determines, according to a local policy, the upgrade package priority may include the following steps.

If there are at least two types of upgrade packages, priorities of these types may be compared, and an upgrade package with a highest priority in the at least two types of upgrade packages is used as the upgrade package priority. For example, when upgrade packages of the security type and the configuration type are included, the server may determine that the upgrade package priority is a security level.

202. The server determines a target upgrade mode for the terminal.

The target upgrade mode includes one of a server-decided upgrade mode, a terminal-decided upgrade mode, or a negotiated upgrade mode.

Figure 3:
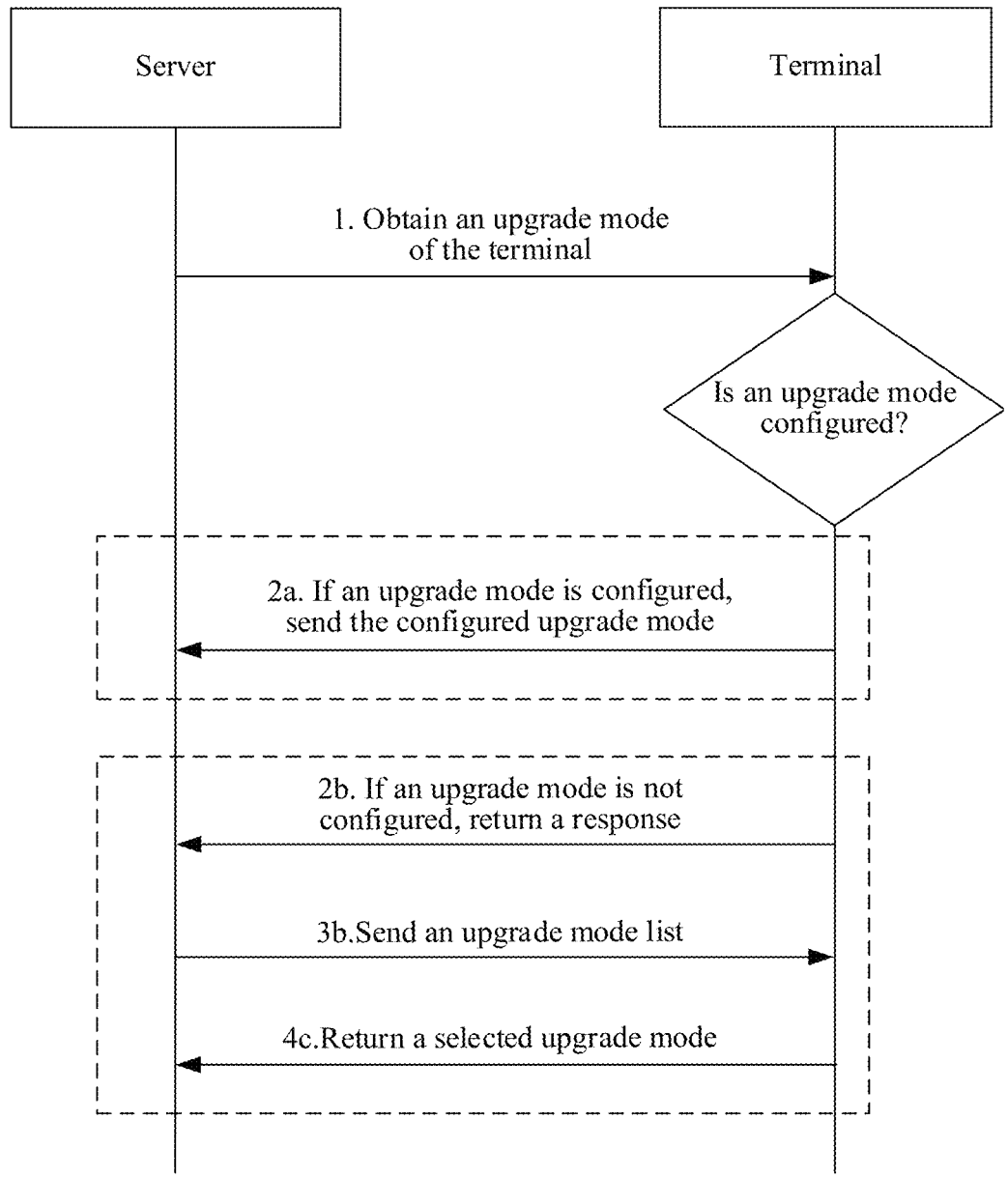
FIG. 3 is a schematic flowchart of configuring an upgrade mode for a terminal according to an embodiment of this application.

Before step 201, the server further needs to obtain an upgrade mode configured in the terminal. As shown in the embodiment in FIG. 3, a major obtaining manner may include the following steps.

1. After the terminal is registered successfully, the server may initiate a resource discovery operation to the terminal, to detect whether an upgrade mode is configured in the terminal.

2a. If an upgrade mode is configured in the terminal, the terminal sends the configured upgrade mode to the server.

In this way, the server may determine, based on the upgrade mode configured in the terminal, the target upgrade mode.

2b. If an upgrade mode is not configured in the terminal, the terminal returns a response to the server.

3b. The server initiates an upgrade mode negotiation request to the terminal.

The upgrade mode negotiation request may carry an upgrade mode list, where the upgrade mode list may include one of the server-decided upgrade mode, the terminal-decided upgrade mode, or the negotiated upgrade mode.

4b. After receiving the upgrade mode negotiation request, the terminal selects an upgrade mode supported by the terminal, completes upgrade mode configuration, and returns the selected upgrade mode to the server.

The terminal may select at least one upgrade mode, and send the at least one upgrade mode to the server using an upgrade mode negotiation response. After receiving the upgrade mode negotiation response, the server may determine, based on the upgrade mode carried in the upgrade mode negotiation response, the target upgrade mode.

In some implementations, if an upgrade mode is not configured in the terminal, the server may directly determine the server-decided upgrade mode as the target upgrade mode for the terminal, and perform the software upgrade procedure of the terminal in the server-decided upgrade mode.

In some implementations, if an upgrade mode is not configured in the terminal, the server may initiate an upgrade mode negotiation request to the terminal, where the upgrade mode negotiation request may carry an upgrade mode list, and the upgrade mode list may include one of the server-decided upgrade mode, the terminal-decided upgrade mode, or the negotiated upgrade mode. The server receives a response from the terminal, and if the response does not carry an upgrade mode, the server may directly determine the server-decided upgrade mode as the target upgrade mode for the terminal, and perform the software upgrade procedure of the terminal in the server-decided upgrade mode.

203. The server sends the upgrade package to the terminal, and performs, based on the target upgrade mode, the software upgrade procedure of the terminal.

204. The terminal obtains the upgrade package from the server, and performs, based on the target upgrade mode, the software upgrade procedure of the terminal.

In some implementations, the server may further obtain an upgrade package type, an upgrade package priority, and service status information of a service in the terminal. The service status information may include at least one of a service status and a service priority. For example, the service status may include an idle state or a non-upgrade state of the service. For example, the service status may further indicate whether a service is operating in the terminal, or whether a previous software upgrade procedure is being performed (for example, a system upgrade or a service upgrade is being performed on the terminal).

In the target upgrade mode, the server may perform the software upgrade procedure of the terminal based on at least one of the upgrade package type, the upgrade package priority, or the service status information of the service in the terminal.

In this embodiment of this application, after determining the target upgrade mode, the server automatically performs, based on the determined target upgrade mode, the software upgrade procedure such that unmanned and automated scheduling of an upgrade can be implemented, and an occasion for starting the software upgrade procedure can be determined from a plurality of dimensions such as the upgrade package type, the upgrade package priority, and the service status information.

Optionally, in some embodiments of this application, the following describes the software upgrade procedure performed between the server and the terminal when the target upgrade mode is the server-decided upgrade mode, the terminal-decided upgrade mode, or the negotiated upgrade mode respectively.

I. When the target upgrade mode is the server-decided upgrade mode, the software upgrade procedure mainly covers the following scenarios.

1. Determine, based on the service status, an occasion for starting the software upgrade procedure.

The server obtains the service status of the service in the terminal from the service status information.

When determining that the service status of the terminal is an idle state or a non-upgrade state, the server sends indication information to the terminal, where the indication information is used to instruct the terminal to stop the service within a preset time. For example, when the service status is the idle state, the preset time may be 0 or a relatively short time interval, and the server may immediately send the indication information to the terminal. When the service status is the non-upgrade state, the preset time may be 0 or a relatively short time interval, and the server may also send the indication information to the terminal. A value of the preset time is not limited in this application. The non-upgrade state means that no software upgrade is currently performed on the terminal. For example, neither a system upgrade nor a software upgrade is currently performed on the terminal.

The server starts the software upgrade procedure after receiving an acknowledgment response from the terminal.

It can be learned that in this application, an upgrade occasion is determined based on the service status. This can avoid an interruption to a service currently performed in the terminal if the software upgrade procedure is immediately performed after the upgrade packet is received, or an interruption to a previous software upgrade procedure of the terminal when the previous software upgrade procedure is not completed currently (for example, a system upgrade or a service upgrade is being performed on the terminal).

2. Determine, based on the upgrade package type, an occasion for starting the software upgrade procedure.

Figure 4:
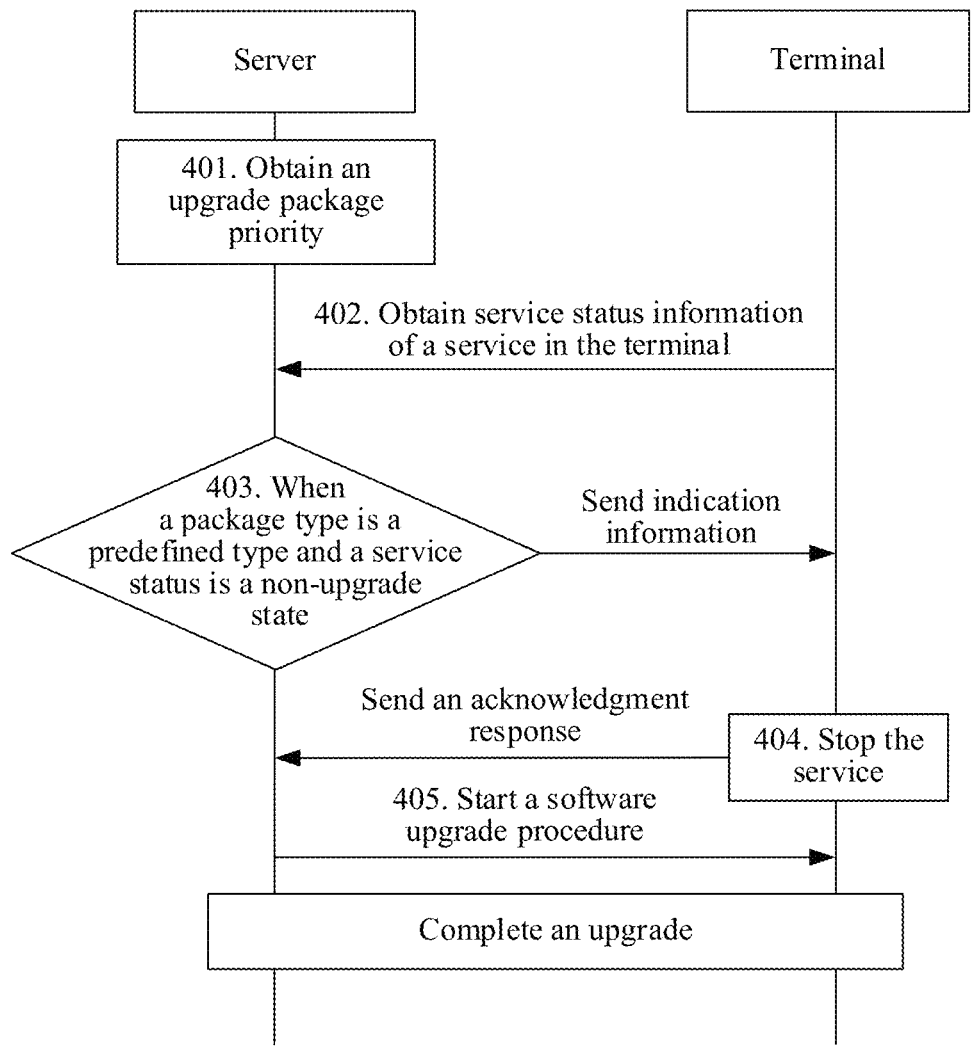
FIG. 4 is a schematic flowchart of performing a software upgrade procedure in a server-decided upgrade mode according to an embodiment of this application.

As shown in FIG. 4, the embodiment may include the following steps.

401. The server obtains the upgrade package and determines the server-decided upgrade mode as the target upgrade mode.

402. The server obtains the service status of the service in the terminal from the service status information.

403. When the upgrade package type is a predefined type and the service status is a non-upgrade state, the server sends indication information to the terminal, where the indication information is used to instruct the terminal to stop the service.

404. After receiving the indication information, the terminal stops the service and sends an acknowledgment response to the server.

405. The server starts the software upgrade procedure after receiving the acknowledgment response from the terminal.

The predefined type may be a security type. When the upgrade package type is the security type and the service status is the non-upgrade state, the server may instruct the terminal to stop the service, to start the software upgrade procedure.

In some implementations, when the upgrade package type is the predefined type and the service status is an idle state, the server sends indication information to the terminal, where the indication information is used to instruct the terminal to stop the service within a preset time. For the preset time, refer to the foregoing descriptions.

In some implementations, the indication information may include a first time or a predefined identifier. The first time is a response time during which the terminal stops the service and performs the software upgrade procedure. The predefined identifier is used to instruct the terminal to stop the service when the terminal receives the indication information.

For example, when the upgrade package type is the security type and the service status is the non-upgrade state, the server may indicate 10 seconds to the terminal, to instruct the terminal to stop the service within 10 seconds and start the software upgrade procedure after 10 seconds.

For another example, when the upgrade package type is the security type and the service status is the non-upgrade state, the server may indicate the predefined identifier to the terminal, to instruct the terminal to stop the service immediately after the terminal receives the predefined identifier and start the software upgrade procedure.

In some implementations, the server may alternatively determine, based on only the upgrade package type, whether to send information that instructs a terminal device to stop the service. For example, when the upgrade package type is the security type, the server may directly send indication information to the terminal, and start the software upgrade procedure after receiving an acknowledgement response returned by the terminal.

It can be learned that automated scheduling of the software upgrade procedure can be implemented using the indication information, and manual intervention is not required. In addition, when the server determines an upgrade occasion based on the upgrade package type and the service status, that a current service or a previous software upgrade procedure is interrupted by performing the software upgrade procedure immediately after the upgrade package is received can be avoided.

3. Determine an occasion for starting the software upgrade procedure by comparing the upgrade package priority with the service priority.

(a) The server obtains the service priority of the service in the terminal from the service status information.

The server sends indication information to the terminal when determining that the upgrade package priority is higher than the service priority, where the indication information is used to instruct the terminal to stop the service.

The server starts the software upgrade procedure after receiving an acknowledgment response from the terminal.

It can be learned that importance of the upgrade package is considered by comparing the upgrade package priority with the service priority. This avoids a conflict between the upgrade procedure of the terminal and the service in the terminal.

(b) The server obtains the service priority and the service status of the service in the terminal from the service status information.

The server sends indication information to the terminal when determining that the upgrade package priority is higher than the service priority and the service status is an idle state, where the indication information is used to instruct the terminal to stop the service.

The server starts the software upgrade procedure after receiving an acknowledgment response from the terminal.

In some implementations, after obtaining the service priority and the service status, the server sends indication information to the terminal when determining that the upgrade package priority is higher than the service priority and the service status is a non-upgrade state. The indication information is used to instruct the terminal to stop the service within a preset time. It can be learned that, in this case, an occasion for starting the software upgrade procedure is determined by considering the service priority, the upgrade package priority, and the service status. This can avoid a service interruption caused by directly starting the upgrade procedure by only considering a difference between the service priority and the upgrade package priority.

Figure 5:
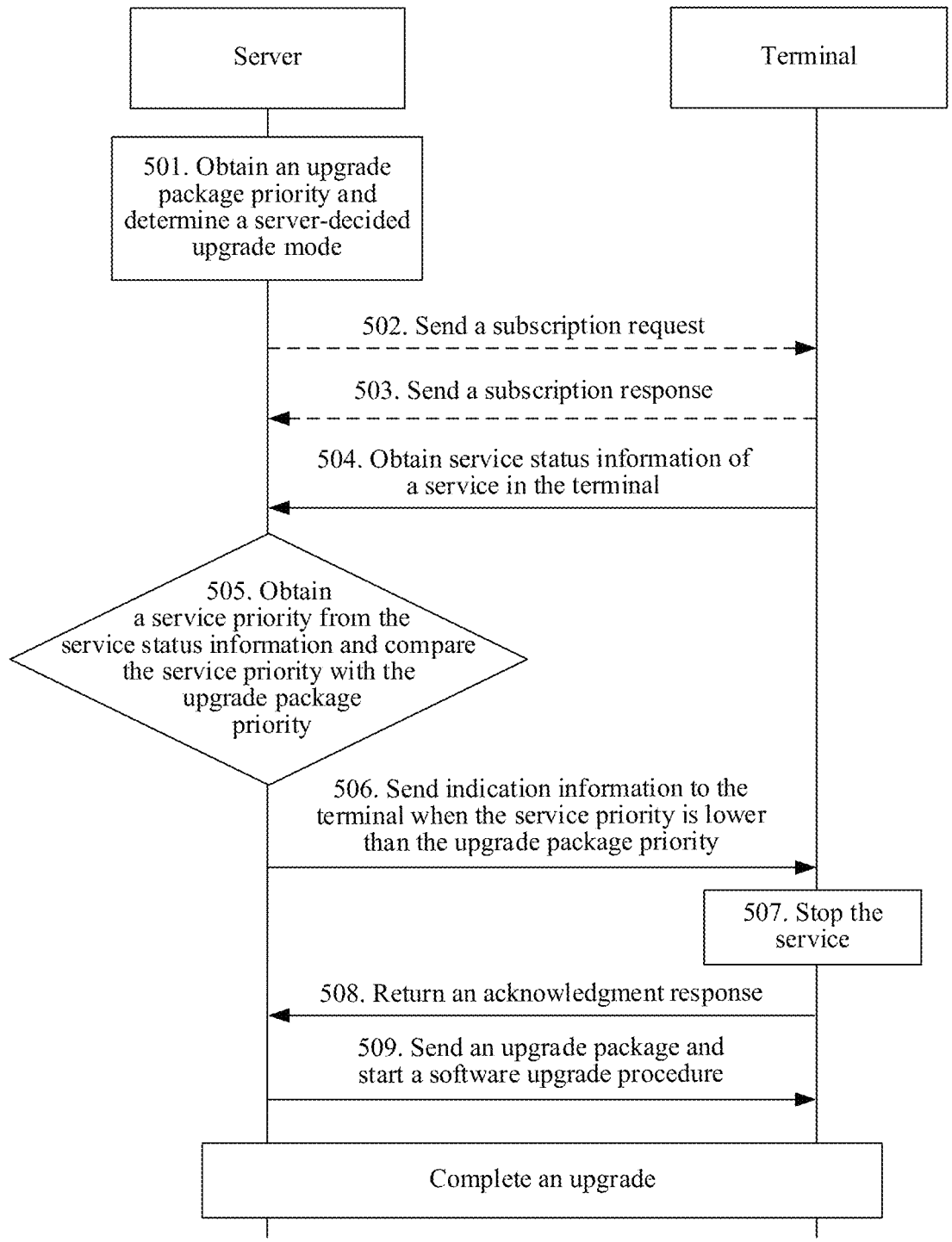
FIG. 5 is a schematic flowchart of performing a software upgrade procedure in a server-decided upgrade mode according to an embodiment of this application.

In some implementations, the server may further determine, based on only the service priority and the upgrade package priority, an occasion for starting the software upgrade procedure. As shown in FIG. 5, the embodiment may include the following steps.

501. The server obtains the upgrade package priority and determines the server-decided upgrade mode as the target upgrade mode.

502. The server sends a subscription request to the terminal, where the subscription request is used to subscribe to service status information of the terminal.

503. The terminal returns a subscription response to the server.

504. The server obtains the service status information of the service from the terminal.

505. The server obtains the service priority from the service status information and compares the service priority with the upgrade package priority.

506. The server sends indication information to the terminal when the service priority is lower than the upgrade package priority.

507. The terminal stops the service after receiving the indication information.

508. The terminal returns an acknowledgment response to the server.

509. The server sends the upgrade package to the terminal and starts the software upgrade procedure.

4. Determine, based on the service priority and the service status, an occasion for starting the software upgrade procedure.

(a) The server obtains the service priority and the service status of the service in the terminal from the service status information.

The server sends indication information to the terminal when determining that the upgrade package priority is higher than the service priority, the upgrade package type is a non-predefined type, and the service status is an idle state or a non-upgrade state, where the indication information is used to instruct the terminal to stop the service.

The server starts the software upgrade procedure after receiving an acknowledgment response from the terminal.

It can be learned that an occasion for starting the software upgrade procedure is determined by considering the service priority, the upgrade package priority, the upgrade package type, and the service status. This can further enhance determining of an occasion for starting the software upgrade procedure and can achieve scheduling at a finer granularity.

Figure 6:
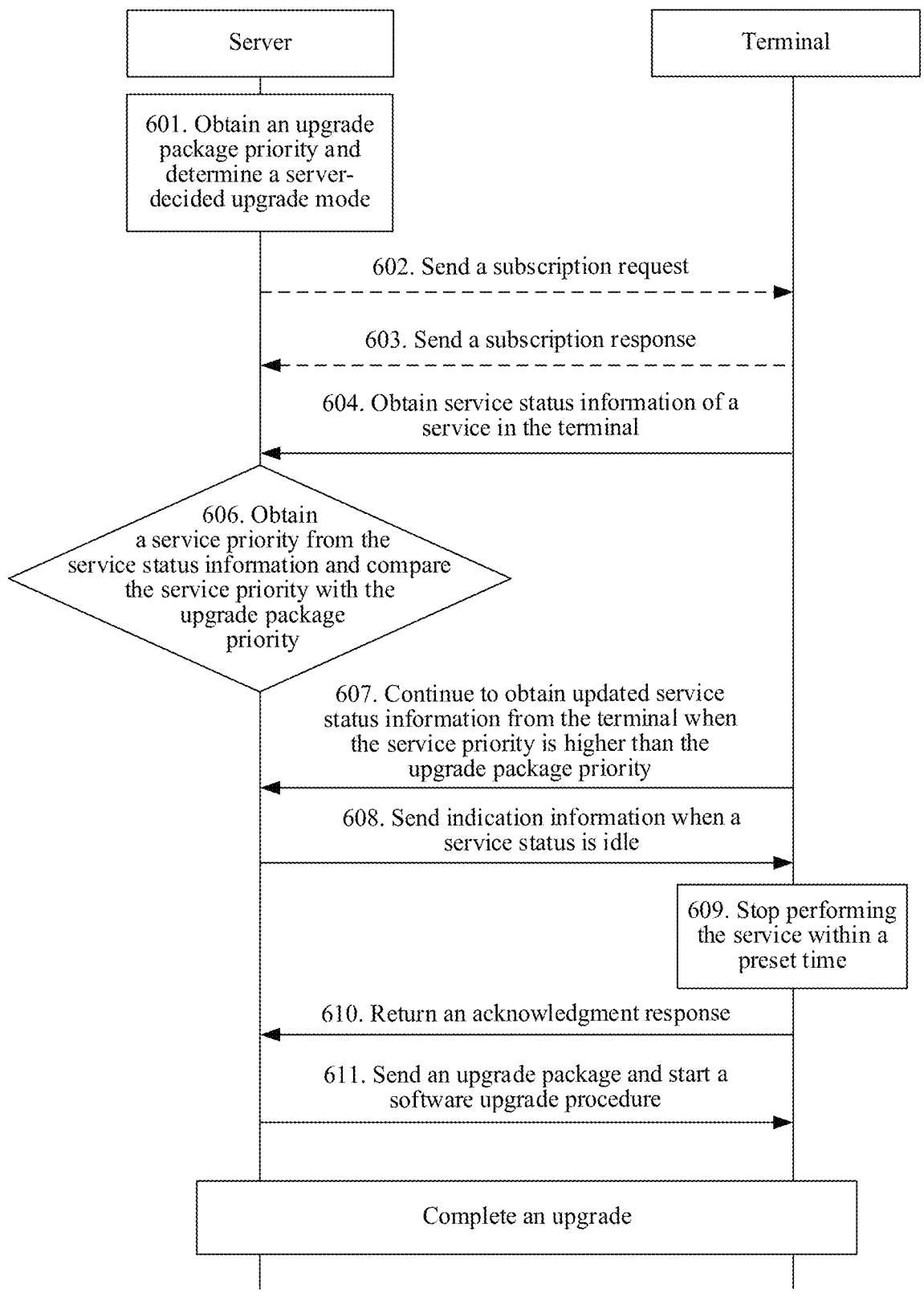
FIG. 6 is a schematic flowchart of performing a software upgrade procedure in a server-decided upgrade mode according to an embodiment of this application.

In some implementations, the server may further determine, based on only the service priority and the upgrade package priority, an occasion for the software upgrade procedure. As shown in FIG. 6, the embodiment may include the following steps.

601. The server obtains the upgrade package priority and determines the server-decided upgrade mode as the target upgrade mode.

602. The server sends a subscription request to the terminal, where the subscription request is used to subscribe to service status information of the terminal.

603. The terminal returns a subscription response to the server.

604. The server obtains the service status information of the service from the terminal.

605. The server obtains the service priority from the service status information and compares the service priority with the upgrade package priority.

607. The server continues to obtain updated service status information from the terminal when the service priority is higher than the upgrade package priority.

608. Send indication information to the terminal when the service status in the service status information is an idle state or a non-upgrade state.

609. The terminal stops the service within a preset time after receiving the indication information.

610. The terminal returns an acknowledgment response to the server.

611. The server sends the upgrade package to the terminal and starts the software upgrade procedure.

(b) The server obtains the service priority and the service status of the service in the terminal from the service status information.

The server sends indication information used to instruct the terminal to stop the service to the terminal when determining that the upgrade package priority is not higher than the service priority and the service status is an idle state or a non-upgrade state.

The server starts the software upgrade procedure after receiving an acknowledgment response from the terminal.

It can be learned that an optimal occasion does not arise for starting the software upgrade procedure at a time when the upgrade package priority is not higher than the service priority. The server may obtain in real time an update of the service status of the terminal, and then determine, based on an updated service status obtained each time, whether an occasion arises for starting the software upgrade procedure. When the updated service status obtained by the server is idle, the server may instruct the terminal to stop the service, to perform the software upgrade procedure. Alternatively, when the updated service status obtained by the server is the non-upgrade state, the server may instruct the terminal to stop the service or stop the service within a preset time. Through dynamic comparison and judgment, the server can implement automated scheduling of an upgrade. This avoids that the software upgrade procedure is not started when it is determined that the upgrade package priority is not higher than the service priority.

II. The target upgrade mode is the negotiated upgrade mode.

Figure 7:
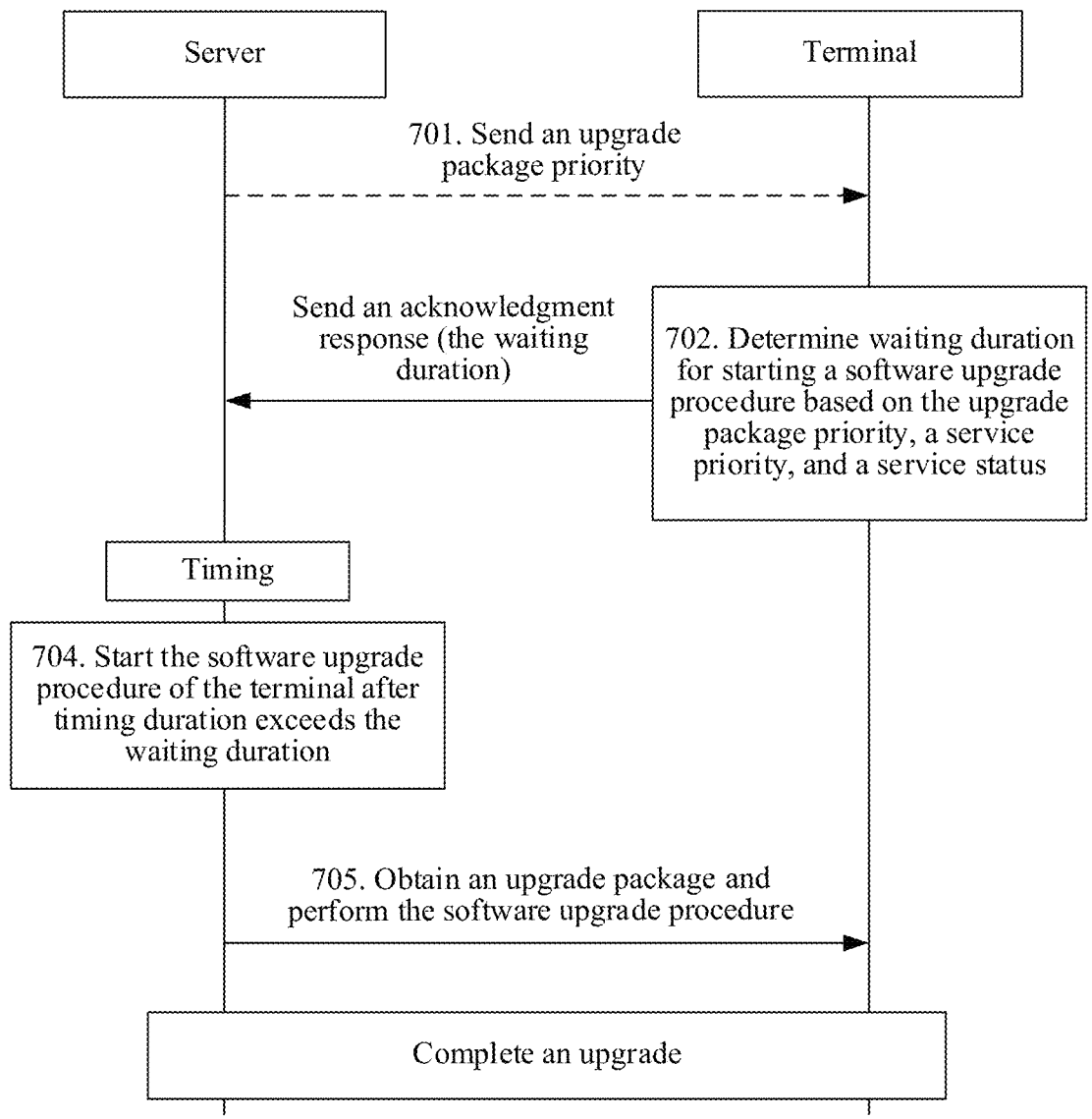
FIG. 7 is a schematic flowchart of performing a software upgrade procedure in a negotiation upgrade mode according to an embodiment of this application.

As shown in FIG. 7, the embodiment may include the following steps.

701. The server sends the upgrade package priority to the terminal, where the upgrade package priority is used by the terminal to determine, based on the upgrade package priority and the service status, whether to start the software upgrade procedure.

702. The terminal obtains the upgrade package priority from the server, and sends an acknowledgment response carrying waiting duration to the server after determining, based on the upgrade package priority, and the service priority and the service status of the service in the terminal, the waiting duration for starting the software upgrade procedure. For example, the waiting duration may be set to 1 hour.

703. The server receives the acknowledgment response carrying the waiting duration from the terminal.

704. The server starts the software upgrade procedure of the terminal after timing duration exceeds the waiting duration.

705. The terminal obtains the upgrade package from the server and performs the software upgrade procedure.

It can be learned that, in the negotiated upgrade mode, the server provides the terminal with the upgrade package priority, to provide a basis for the terminal to determine whether to start the software upgrade procedure. In addition, the server automatically starts, based on the waiting duration returned by the terminal, the software upgrade procedure, and the terminal does not need to initiate an upgrade request again. This implementation is particularly applicable to a scenario in which ending or interrupting a current service in the terminal is inappropriate.

III. The target upgrade mode is the terminal-decided upgrade mode.

Figure 8:
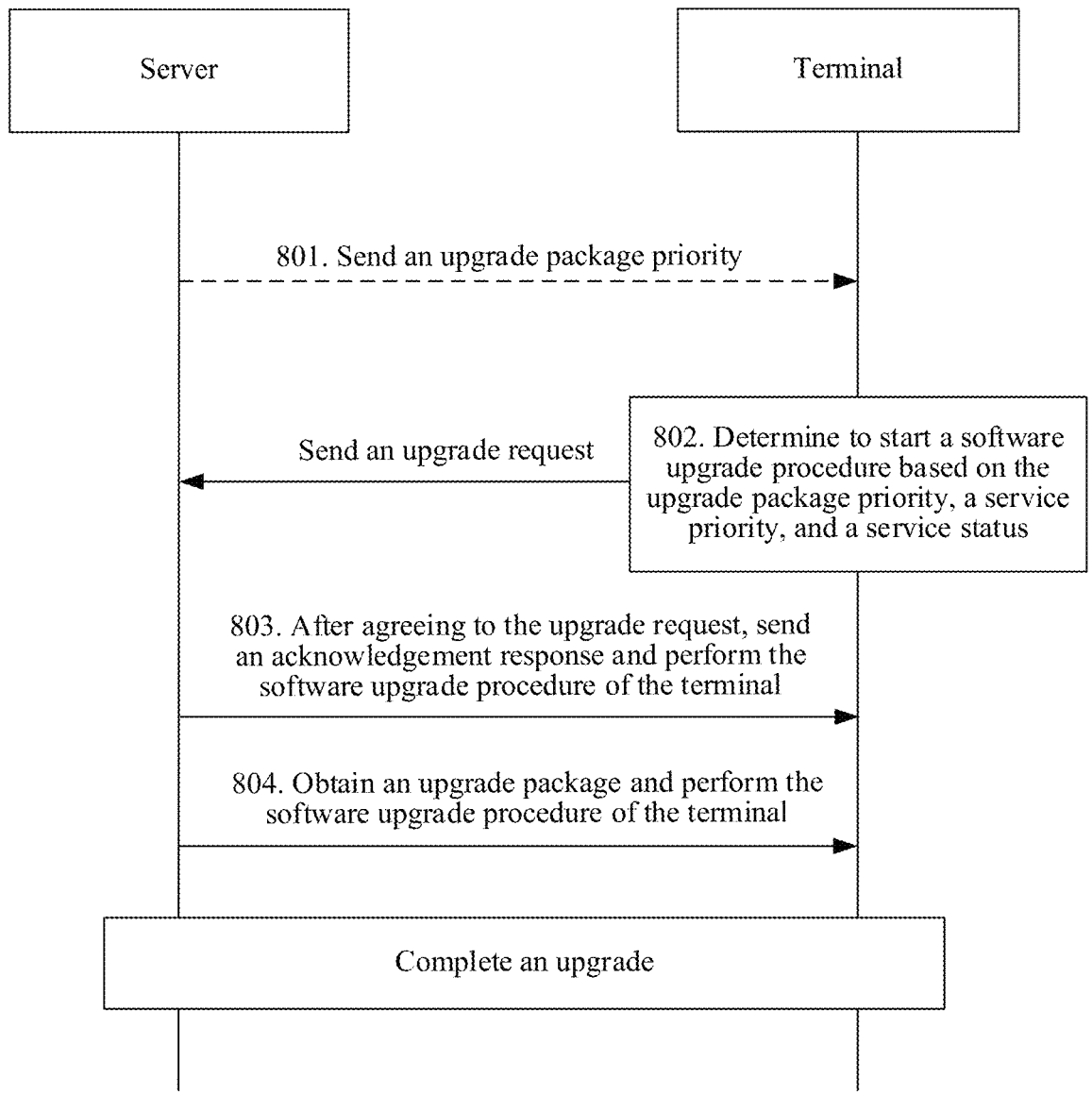
FIG. 8 is a schematic flowchart of performing a software upgrade procedure in a terminal-decided upgrade mode according to an embodiment of this application.

As shown in FIG. 8, the embodiment may include the following steps.

801. The server sends the upgrade package priority to the terminal, where the upgrade package priority is used by the terminal to determine, based on the upgrade package priority and the service priority, whether to start the software upgrade procedure.

802. The terminal obtains the upgrade package priority from the server, and sends an upgrade request to the server after determining, based on the upgrade package priority and the service priority of the service in the terminal, to start the software upgrade procedure.

803. After receiving and agreeing to the upgrade request from the terminal, the server sends an acknowledgment response to the terminal and performs the software upgrade procedure of the terminal.

804. Correspondingly, after receiving the acknowledgment response from the server, the terminal obtains the upgrade package from the server and starts the software upgrade procedure.

It can be learned that, in the terminal-decided upgrade mode, the server provides the terminal with the upgrade package priority, to provide a basis for the terminal to determine whether to start the software upgrade procedure.

In addition, in the terminal-decided upgrade mode, the server may further send the upgrade package type to the terminal, and the terminal may determine, based on the upgrade package type (which may also be combined with the service status), an occasion for starting the software upgrade procedure. Alternatively, in the terminal-decided upgrade mode, the server may further send only an upgrade request to the terminal, where the upgrade request may not carry information such as the upgrade package priority or the upgrade package type and may be used only to indicate to the terminal that there is a to-be-upgraded upgrade package. After receiving the upgrade request, the terminal may independently determine, based on a service status or a service priority of the terminal, an occasion for starting the software upgrade procedure.

Figure 9:
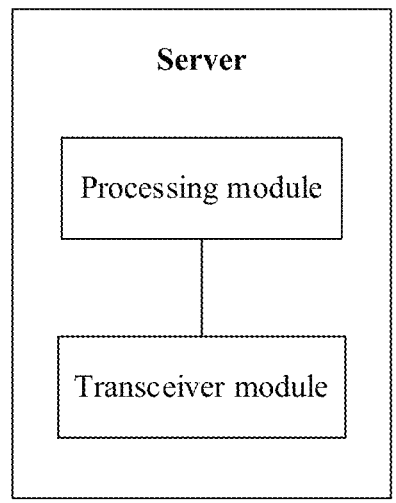
FIG. 9 is a schematic structural diagram of a server according to an embodiment of this application.
Figure 10:
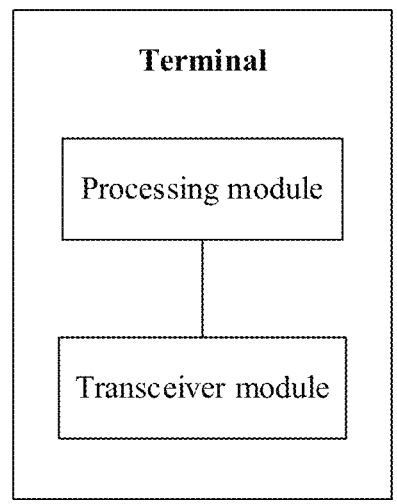
FIG. 10 is a schematic structural diagram of a terminal according to an embodiment of this application.
Figure 11:
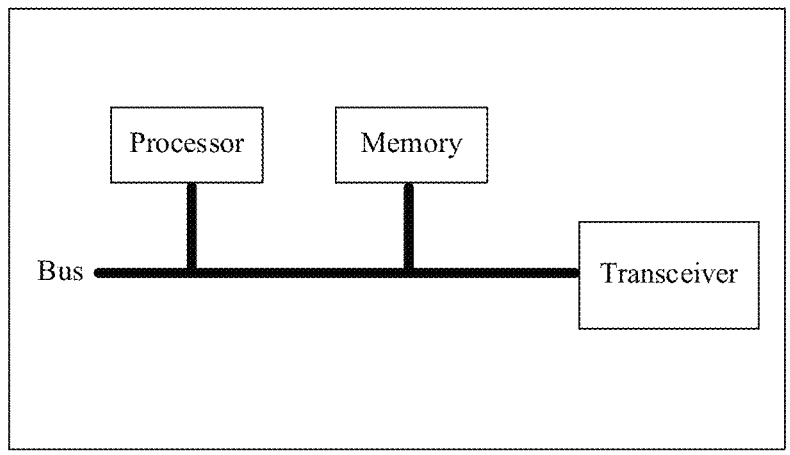
FIG. 11 is a schematic structural diagram of a device that performs a software upgrade management method according to an embodiment of this application.

The technical features described in the foregoing embodiments, such as the target upgrade mode, the upgrade package priority, the upgrade package type, the service status information, and the waiting duration, are also applicable to the embodiments corresponding to FIG. 9 to FIG. 11 in this application. Details about similarities are not described again subsequently.

The foregoing describes a software upgrade management method in this application. The following separately describes a server and a terminal that perform the software upgrade management.

FIG. 9 is a schematic structural diagram of a server. The server in this embodiment of this application can implement a step of the software upgrade management performed by the server in the embodiment corresponding to any of FIG. 2 to FIG. 8. A function implemented by the server may be implemented by hardware, or may be implemented by hardware by executing corresponding software. The hardware or the software includes one or more modules corresponding to the foregoing function. The module may be software and/or hardware. The server may include a transceiver module and a processing module. For function implementation of the processing module, refer to the operations, such as determining, by the server, a target upgrade mode, and an upgrade package priority and an upgrade package type, and obtaining a service priority and a service status from service status information, in the embodiment corresponding to any of FIG. 2 to FIG. 8. Details are not described herein. For function implementation of the transceiver module, refer to the operations, such as obtaining, by the server, an upgrade package and service status information, and receiving an acknowledgment response and an upgrade request from a terminal, in the embodiment corresponding to any one of FIG. 2 to FIG. 8. The processing module may be configured to control receiving and sending operations of the transceiver module.

In some implementations, the transceiver module may be configured to obtain an upgrade package.

The processing module may be configured to determine a target upgrade mode for the terminal. The target upgrade mode includes one of a server-decided upgrade mode, a terminal-decided upgrade mode, or a negotiated upgrade mode.

The processing module sends, using the transceiver module, the upgrade package to the terminal, and performs, based on the target upgrade mode, a software upgrade procedure of the terminal.

It can be learned that, after determining the target upgrade mode, the processing module of the server automatically performs the software upgrade procedure based on the determined target upgrade mode, thereby implementing unmanned and automated scheduling of an upgrade.

In some implementations, the processing module includes the following steps.

In the target upgrade mode, the server performs the software upgrade procedure of the terminal based on at least one of an upgrade package type, an upgrade package priority, or service status information of a service in the terminal. The service status information includes at least one of a service status and a service priority.

In some implementations, when the target upgrade mode is the server-decided upgrade mode, the processing module is configured to obtain, using the transceiver module, the service status of the service in the terminal from the service status information, send, using the transceiver module, indication information to the terminal when determining that the service status of the terminal is an idle state or a non-upgrade state, where the indication information is used to instruct the terminal to stop the service within a preset time, and start the software upgrade procedure after the transceiver module receives an acknowledgment response from the terminal.

In some implementations, when the target upgrade mode is the server-decided upgrade mode, the processing module is configured to obtain, using the transceiver module, the service status of the service in the terminal from the service status information, send, using the transceiver module, indication information to the terminal when the upgrade package type is a predefined type and the service status is a non-upgrade state, where the indication information is used to instruct the terminal to stop the service, and start the software upgrade procedure after the transceiver module receives an acknowledgment response from the terminal.

In some implementations, the indication information includes a first time or a predefined identifier. The first time is a response time during which the terminal stops the service and performs the software upgrade procedure. The predefined identifier is used to instruct the terminal to stop the service when the terminal receives the indication information.

In some implementations, when the target upgrade mode is the server-decided upgrade mode, the processing module is configured to obtain, using the transceiver module, the service priority of the service in the terminal from the service status information, send, using the transceiver module, indication information to the terminal when determining that the upgrade package priority is higher than the service priority, where the indication information is used to instruct the terminal to stop the service, and start the software upgrade procedure after the transceiver module receives an acknowledgment response from the terminal.

In some implementations, when the target upgrade mode is the server-decided upgrade mode, the processing module is configured to obtain, using the transceiver module, the service priority and the service status of the service in the terminal from the service status information, send, using the transceiver module, indication information to the terminal when determining that the upgrade package priority is higher than the service priority and the service status is an idle state, where the indication information is used to instruct the terminal to stop the service, and start the software upgrade procedure after the transceiver module receives an acknowledgment response from the terminal.

In some implementations, when the target upgrade mode is the server-decided upgrade mode, the processing module is configured to obtain, using the transceiver module, the service priority and the service status of the service in the terminal from the service status information, send, using the transceiver module, indication information to the terminal when determining that the upgrade package priority is higher than the service priority, the upgrade package type is a non-predefined type, and the service status is an idle state or a non-upgrade state, where the indication information is used to instruct the terminal to stop the service, and start the software upgrade procedure after the transceiver module receives an acknowledgment response from the terminal.

In some implementations, when the target upgrade mode is the server-decided upgrade mode, the processing module is configured to obtain, using the transceiver module, the service priority and the service status of the service in the terminal from the service status information, send, using the transceiver module, indication information used to instruct the terminal to stop the service to the terminal when determining that the upgrade package priority is not higher than the service priority and the service status is an idle state or a non-upgrade state, and start the software upgrade procedure after the transceiver module receives an acknowledgment response from the terminal.

In some implementations, when the target upgrade mode is the terminal-decided upgrade mode, the processing module is configured to send, using the transceiver module, the upgrade package priority to the terminal, where the upgrade package priority is used by the terminal to determine, based on the upgrade package priority and the service priority, whether to start the software upgrade procedure, and after the transceiver module receives an upgrade request from the terminal, agree to the upgrade request and perform the software upgrade procedure of the terminal.

In some implementations, when the target upgrade mode is the negotiated upgrade mode, the processing module is configured to send, using the transceiver module, the upgrade package priority to the terminal, where the upgrade package priority is used by the terminal to determine, based on the upgrade package priority and the service status, whether to start the software upgrade procedure, receive, using the transceiver module, an acknowledgment response carrying waiting duration from the terminal, and start the software upgrade procedure of the terminal after timing duration exceeds the waiting duration.

FIG. 10 is a schematic structural diagram of a terminal. The terminal in this application may be a device that provides a user with voice and/or data connectivity. For example, the terminal may be a portable, a pocket-sized, a handheld, a computer built-in, or an in-vehicle mobile apparatus, for example, a water meter, an electricity meter, a natural gas meter, a shared bicycle, a smart household, or another smart device, which exchanges voice and/or data with a radio access network. For example, it may be a device such as a Personal Communication Service (PCS) phone, a cordless telephone set, a Session Initiation Protocol (SIP) phone, a wireless local loop (WLL) station, or a personal digital assistant (PDA). The wireless terminal may also be any terminal such as a subscriber unit, a subscriber station, a mobile station, a mobile station (Mobile), a user terminal, a user agent, a user device, user equipment, a point of sales (POS), or an in-vehicle computer.

The terminal in this embodiment of this application can implement a step of the software upgrade management performed by the terminal in the embodiment corresponding to any of FIG. 2 to FIG. 8. A function implemented by the terminal may be implemented by hardware, or may be implemented by hardware by executing corresponding software. The hardware or the software includes one or more modules corresponding to the foregoing function. The module may be software and/or hardware. The terminal may include a transceiver module and a processing module. For function implementation of the processing module, refer to the operations, such as determining, by the terminal, an upgrade package priority and an upgrade package type, and determining an occasion for starting a software upgrade procedure, in the embodiment corresponding to any of FIG. 2 to FIG. 8. Details are not described herein. For function implementation of the transceiver module, refer to the operations, such as obtaining, by the terminal, an upgrade package priority, an upgrade package type, an upgrade package, and service status information, and receiving an upgrade negotiation request, an acknowledgment response and an upgrade request from a server, in the embodiment corresponding to any of FIG. 2 to FIG. 8. The processing module may be configured to control receiving and sending operations of the transceiver module.

In some implementations, the transceiver module may be configured to send an upgrade mode configured in the terminal to the server, where the upgrade mode configured in the terminal is used by the server to determine a target upgrade mode for the terminal. The target upgrade mode includes one of a server-decided upgrade mode, a terminal-decided upgrade mode, or a negotiated upgrade mode.

The processing module may be configured to perform, based on the target upgrade mode, a software upgrade procedure of the terminal after the transceiver module obtains an upgrade package from the server.

It can be learned that the transceiver module of the terminal provides the configured upgrade mode to the server, to provide a basis for the server to determine the target upgrade mode. After the transceiver module obtains the upgrade package, the processing module may automatically perform, based on the target upgrade mode determined by the server, the software upgrade procedure, thereby implementing unmanned and automated scheduling of an upgrade.

In some implementations, when the target upgrade mode is the terminal-decided upgrade mode, the processing module is configured to obtain, using the transceiver module, an upgrade package priority from the server, send, using the transceiver module, an upgrade request to the server after determining, based on the upgrade package priority and a service priority of a service in the terminal, to start the software upgrade procedure, and after the transceiver module receives an acknowledgment response from the server, obtain the upgrade package from the server and start the software upgrade procedure.

In some implementations, when the target upgrade mode is a negotiation upgrade mode, the processing module is configured to obtain, using the transceiver module, an upgrade package priority from the server, send, using the transceiver module, an acknowledgment response carrying waiting duration to the server after determining, based on the upgrade package priority, and a service priority and a service status of a service in the terminal, the waiting duration for starting the software upgrade procedure, and after timing duration exceeds the waiting duration, obtain, using the transceiver module, the upgrade package from the server and perform the software upgrade procedure.

In some implementations, when the target upgrade mode is the server-decided upgrade mode, the processing module is configured to send, using the transceiver module, service status information of a service in the terminal to the server, where the service status information is used by the server to determine at least one of a service priority or a service status of the service in the terminal, and after the transceiver module receives, from the server, indication information used to instruct the terminal to stop the service, obtain, using the transceiver module, the upgrade package from the server and perform the software upgrade procedure of the terminal.

FIG. 11 is a schematic structural diagram of a device provided for performing software upgrade management according to an embodiment of this application. The device may include at least one processor, at least one transceiver, a memory, and at least one bus. The at least one processor, the at least one transceiver, and the memory may be connected by a bus or in another manner. In FIG. 11, a bus connection is used as an example.

The memory may include a read-only memory (ROM) and a random-access memory (RAM), and provide an instruction and data to the processor. A part of the memory may further include a non-volatile RAM (NVRAM). The memory stores an operating system and an operation instruction, an executable module or a data structure, or a subnet thereof, or an extended set thereof. The operation instruction may include various operation instructions for implementing various operations. The operating system may include various system programs, to implement various basic tasks and process hardware-based tasks.

The processor controls operations of the device used for software upgrade management, and the processor may also be referred to as a central processing unit (CPU). In specific application, all components of the device used for software upgrade management are coupled together by a bus. The bus may include a power supply bus, a control bus, a status signal bus, and the like, in addition to a data bus. However, for clarity of description, various buses are referred to as the bus in FIG. 11.

It should be noted that physical devices corresponding to all transceiver modules in the embodiments of this application (including the embodiments shown in FIG. 9 and FIG. 10) may be transceivers, and physical devices corresponding to all processing modules may be processors. The apparatuses shown in FIG. 9 and FIG. 10 may have the structure shown in FIG. 11. When one of the apparatuses has the structure shown in FIG. 11, the processor and the transceiver in FIG. 11 implement same or similar functions of the processing module and the transceiver module respectively provided in the apparatus embodiment corresponding to the apparatus, and the memory in FIG. 11 stores program code that needs to be invoked when the processor performs the software upgrade management method. The transceiver may also be replaced with a receiver and a transmitter, and the receiver and the transmitter may be a same physical entity or different physical entities. When being the same physical entity, the receiver and the transmitter may be collectively referred to as a transceiver. For example, the transceiver may be a radio frequency (RF) circuit. The memory may be integrated into the processor, or may be separate from the processor.

The methods disclosed in the foregoing embodiments of this application may be applied to the processor shown in FIG. 11, or may be implemented by the processor shown in FIG. 11. For example, in some implementations, the processor in FIG. 11 may invoke a program instruction stored in the memory, and the processor further executes program code that needs to be invoked when the software upgrade management method in the embodiments of this application is performed.

For example, when the server has the structure shown in FIG. 11, the memory in FIG. 11 stores program code that needs to be invoked when the processor performs the software upgrade management method performed by the server. Further, the processor in FIG. 11 can invoke the program code in the memory to perform the following operations.

Obtain, using the transceiver, an upgrade package.

Determine a target upgrade mode for a terminal, where the target upgrade mode includes one of a server-decided upgrade mode, a terminal-decided upgrade mode, or a negotiated upgrade mode.

Send, using the transceiver, the upgrade package to the terminal and perform, based on the target upgrade mode, a software upgrade procedure of the terminal.

For another example, when the terminal has the structure shown in FIG. 11, the memory in FIG. 11 stores program code that needs to be invoked when the processor performs the software upgrade management method performed by the terminal. Further, the processor in FIG. 11 can invoke the program code in the memory to perform the following operations.

Send, using the transceiver, an upgrade mode configured in the terminal to the server, where the upgrade mode configured in the terminal is used by the server to determine a target upgrade mode for the terminal, and the target upgrade mode includes one of a server-decided upgrade mode, a terminal-decided upgrade mode, or a negotiated upgrade mode.

Perform, based on the target upgrade mode, a software upgrade procedure of the terminal after the transceiver obtains an upgrade package from the server.

Figure 12:
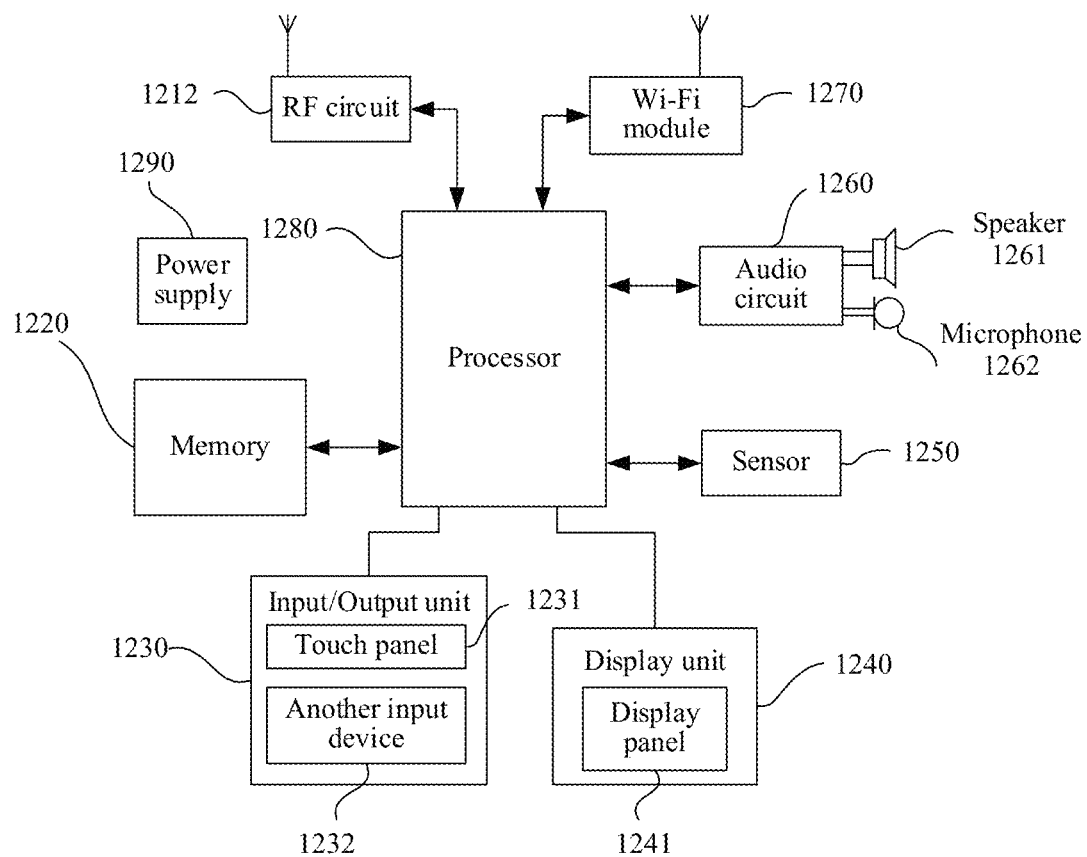
FIG. 12 is a schematic structural diagram of an Internet of Things terminal according to an embodiment of this application.

An embodiment of this application further provides another terminal. An Internet of Things terminal is used as an example. FIG. 12 is a block diagram of a partial structure related to an Internet of Things terminal according to an embodiment of this application. Referring to FIG. 12, the Internet of Things terminal includes at least an RF circuit 1212, a memory 1220, and a processor 1280. It may be understood by a person skilled in the art that, the structure of the Internet of Things terminal shown in FIG. 12 does not constitute a limitation on the Internet of Things terminal, and components more or fewer than those shown in FIG. 12 may be included, or some components may be combined, or a different component deployment may be used.

The following details each component of the Internet of Things terminal with reference to FIG. 12.

The RF circuit 1212 may be configured to receive and send a signal during information reception and sending, and particularly, send received information from a server to the processor 1280 for processing. In addition, the RF circuit 1212 sends information about the Internet of Things terminal to the server. Generally, the RF circuit 1212 includes but is not limited to an antenna, at least one amplifier, a transceiver, a coupler, a low noise amplifier (LNA), a duplexer, or the like. In addition, the RF circuit 1212 may further communicate with a network and another device through wireless communication. The wireless communication may use any communications standard or protocol, which includes but is not limited to a Global System for Mobile Communications (GSM), a General Packet Radio Service (GPRS), code division multiple access (CDMA), wideband code-division multiple access (WCDMA), Long-Term Evolution (LTE), an email, or a short message service (SMS), or the like. The RF circuit 1212 may be corresponding to the transceiver module in FIG. 9 or FIG. 10, or the transceiver shown in FIG. 11.

The memory 1220 may be configured to store a software program and a module. The processor 1280 runs the software program and the module stored in the memory 1220, to perform various function applications of the Internet of Things terminal and data processing. The memory 1220 may mainly include a program storage area and a data storage area. The program storage area may store an operating system, an application program required by at least one function (such as a sound play function and an image play function), and the like. The data storage area may store data (such as audio data or a phone book) created based on use of the Internet of Things terminal, and the like. In addition, the memory 1220 may include a high-speed random access memory, and may further include a non-volatile memory such as at least one magnetic disk storage device, a flash storage device, or another volatile solid-state storage device.

The processor 1280 is a control center of the Internet of Things terminal, and may be configured to control an operation of the Internet of Things terminal. Further, the processor 1280 may connect all parts of the entire Internet of Things terminal using various interfaces and wires, and perform various functions of the Internet of Things terminal and data processing by running or executing a software program and/or a module stored in the memory 1220 and invoking data stored in the memory 1220, thereby performing overall monitoring on the Internet of Things terminal. The processor 1280 may be corresponding to the processing module in FIG. 9 or FIG. 10, or the processor shown in FIG. 11.

The Internet of Things terminal may further include an input/output unit 1230, a power supply 1290, a display unit 1240, an audio circuit 1260, a loudspeaker 1261, a microphone 1262, and a WI-FI module 1270.

The input/output unit 1230 may be configured to receive input digit or character information, and output digit or character information using an external interface. Further, the input/output unit 1230 may include a touch panel 1231 and another input device 1232. The touch panel 1231, also referred to as a touchscreen, may collect a touch operation (for example, an operation performed by a user on or near the touch panel 1231 using any proper object or accessory such as a finger or a stylus) performed by the user on or near the touch panel 1231, and drive a corresponding connection apparatus based on a preset program.

The power supply 1290 is configured to supply power to each component in the Internet of Things terminal. The power supply 1290 may be logically connected to the processor 1280 using a power supply management system, to implement functions such as charging management, discharging management, and power consumption management using the power supply management system.

The display unit 1240 may be configured to display information entered by the user or information provided for the user, and various menus of the Internet of Things terminal. The display unit 1240 may include a display panel 1241. Optionally, the display panel 1241 may be configured in a form of a liquid-crystal display (LCD), an organic light-emitting diode (OLED), or the like. Further, the touch panel 1231 may cover the display panel 1241. After detecting a touch operation on or near the touch panel 1231, the touch panel 1231 transfers the touch operation to the processor 1280 to determine a type of a touch event. Subsequently, the processor 1280 provides a corresponding visual output on the display panel 1241 based on the type of the touch event. In FIG. 12, the touch panel 1231 and the display panel 1241 are used as two independent components to implement input and output functions of the Internet of Things terminal. In some embodiments, the touch panel 1231 and the display panel 1241 may be integrated to implement the input and output functions of the Internet of Things terminal.

The audio circuit 1260, the speaker 1261, and the microphone 1262 may provide an audio interface between the user and the Internet of Things terminal. The audio circuit 1260 may transmit, to the loudspeaker 1261, an electric signal converted from received audio data, and the loudspeaker 1261 converts the electric signal into a sound signal for output. In addition, the microphone 1262 converts a collected sound signal into an electric signal, and the audio circuit 1260 receives and converts the electrical signal into audio data and outputs the audio data to the processor 1280. The processor 1280 processes the audio data and then sends the processed audio data to, for example, another Internet of Things terminal through the RF circuit 1212, or outputs the processed audio data to the memory 1220 for further processing.

WI-FI is a short-range wireless transmission technology. The Internet of Things terminal may help, using the WI-FI module 1270, the user receive and send emails, browse a web page, access streaming media, and the like. The WI-FI module 1270 provides the user with wireless broadband Internet access. FIG. 12 shows the WI-FI module 1270. However, it can be understood that the WI-FI module 1270 is not a mandatory component of the Internet of Things terminal, and may be totally omitted as required without changing the essence of this application.

Although not shown, the Internet of Things terminal may further include a camera, a Bluetooth module, and the like. Details are not described herein.

In this embodiment of this application, the processor 1280 included in the Internet of Things terminal further controls performing of a procedure of the foregoing software upgrade management method performed by a terminal.

An embodiment of this application provides another server. As shown in a schematic structural diagram in FIG. 13, the server 1300 may vary greatly because of a difference in configuration or performance, and may include one or more CPU 1322 (for example, one or more processors), input/output interfaces 1358, and memories 1332. The server may further include one or more storage media 1330 (for example, one or more mass storage devices) storing data 1344 or an application program 1342.

The central processor 1322 may be configured to communicate with the storage medium 1330 to perform, on the server 1300, a series of instruction operations in the storage medium 1330. The CPU 1322 may be corresponding to the processing module in FIG. 9 or FIG. 10, or the processor shown in FIG. 11. The storage medium 1330 may be corresponding to the memory shown in FIG. 11.

The input/output interface 1358 may be corresponding to the transceiver module in FIG. 9 or FIG. 10, or the transceiver shown in FIG. 11.

The memory 1332 and the storage medium 1330 may be transitory storage or persistent storage. A program stored in the storage medium 1330 may include one or more modules (not shown in the figure), and each module may include a series of instruction operations for a server.

The server 1300 may further include one or more power supplies 1326, one or more wired or wireless network interfaces 1350, one or more input/output interfaces 1358, and/or one or more operating systems 1341 such as WINDOWS SERVER, MAC OS X, UNIX, LINUX, and FREEBSD.

Figure 13:
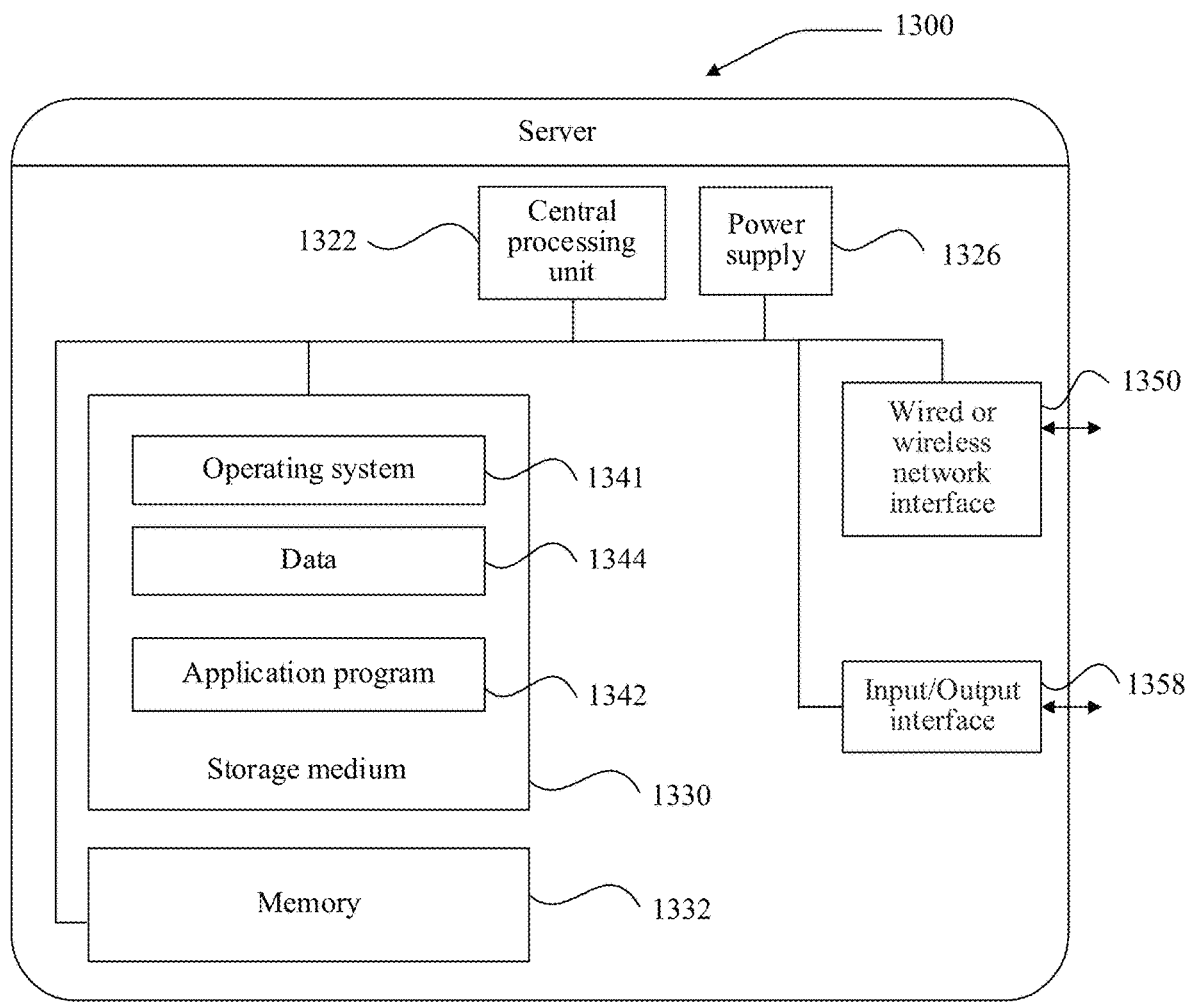
FIG. 13 is another schematic structural diagram of a server according to an embodiment of this application.

Steps performed by the server in the foregoing embodiments may be based on the server structure shown in FIG. 13.

In the foregoing embodiments, the descriptions of the embodiments have respective focuses. For a part that is not described in detail in an embodiment, refer to related descriptions in another embodiment.

It may be clearly understood by a person skilled in the art that, for the purpose of convenient and brief description, for a detailed working process of the described system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the module division is merely logical function division and may be other division in an embodiment. For example, a plurality of modules or software may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in this application may be integrated into one processing module, or each of the modules may exist alone physically, or two or more modules are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

All or some of the foregoing embodiments may be implemented by means of software, hardware, firmware, or any combination thereof. When software is used to implement the embodiments, the embodiments may be implemented in a form of a computer program product fully or partially.

The computer program product includes one or more computer instructions. When the computer program instruction is loaded and executed on a computer, some or all of the procedures or functions according to the embodiments of this application are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The technical solutions provided in this application are described in detail above. The principle and implementation of this application are described herein through specific examples. The description about the embodiments is merely provided to help understand the method and core ideas of this application. In addition, a person of ordinary skill in the art can make variations and modifications to this application in terms of the specific implementations and application scopes according to the idea of this application. Therefore, the content of specification shall not be construed as a limit to this application.

What is claimed is:

1. A method implemented by a server, wherein the method comprises:
    determining an internet of things (IOT) terminal is registered successfully, wherein an IOT system includes the IOT terminal and the server configured to perform cluster management on the IOT terminal;
    obtaining an upgrade package;
    determining a target upgrade mode for the IOT terminal, wherein the target upgrade mode comprises a terminal-decided upgrade mode;
    sending an upgrade package priority to the IOT terminal for the IOT terminal to determine, based on the upgrade package priority and service status information of a service in the IOT terminal, to start a software upgrade procedure, wherein the service status information comprises at least one of a service status or a service priority, and wherein the service status indicates an idle state of the service or a non-upgrade state of the service;
    sending the upgrade package to the IOT terminal; and
    performing, using the upgrade package, the software upgrade procedure of the IOT terminal based on the target upgrade mode.

2. The method of claim 1, wherein before sending the upgrade package to the IOT terminal, the method further comprises:
    receiving an upgrade request from the IOT terminal after determining to start the software upgrade procedure; and
    agreeing to the upgrade request and sending an acknowledgment response to the IOT terminal.

3. The method of claim 1, wherein determining the target upgrade mode comprises receiving a configured upgrade mode from the IOT terminal, and wherein the terminal-decided upgrade mode is a mode in which the IOT terminal determines whether to start the software upgrade procedure and/or when to start the software upgrade procedure.

4. The method of claim 1, wherein after determining the terminal is registered successfully, the method further comprises initiating a resource discovery operation to the IOT terminal to detect whether the target upgrade mode is configured in the IOT terminal.

5. The method of claim 1, further comprising sending an upgrade package type to the IOT terminal, wherein the upgrade package type is for the IOT terminal to determine, based on the upgrade package type, the upgrade package priority, and the service status information, to start the software upgrade procedure.

6. The method of claim 5, wherein the upgrade package type comprises one of a security type, a function type, a configuration type, or a general type.

7. The method of claim 1, further comprising:
    comparing priorities of at least two types of upgrade packages; and
    determining to use the upgrade package based on the upgrade package having a highest priority in the at least two types of upgrade packages.

8. The method of claim 1, wherein before sending the upgrade package priority to the IOT terminal, the method further comprises:
    obtaining upgrade package priority information; and
    determining, based on the upgrade package priority information, the upgrade package priority.

9. A server comprising:
    a processor configured to:
        determine an internet of things (IOT) terminal is registered successfully, wherein an IOT system includes the IOT terminal and the server configured to perform cluster management on the IOT terminal; and
        determine a target upgrade mode for the IOT terminal, wherein the target upgrade mode comprises a terminal-decided upgrade mode; and
    a transceiver coupled to the processor and configured to:
        obtain an upgrade package;
        send an upgrade package priority to the IOT terminal for the IOT terminal to determine, based on the upgrade package priority and service status information of a service in the IOT terminal, to start a software upgrade procedure, wherein the service status information comprises at least one of a service status or a service priority, and wherein the service status indicates an idle state or a non-upgrade state of the service; and
        send the upgrade package to the IOT terminal,
    wherein the processor is further configured to perform, using the upgrade package, the software upgrade procedure of the IOT terminal based on the target upgrade mode.

10. The server of claim 9, wherein the transceiver is further configured to receive an upgrade request from the IOT terminal after determining to start the software upgrade procedure, and wherein the processor is further configured to agree to the upgrade request and send an acknowledgment response to the IOT terminal.

11. The server of claim 9, wherein the transceiver is further configured to receive a configured upgrade mode from the IOT terminal, and wherein the terminal-decided upgrade mode is a mode in which the IOT terminal determines whether to start the software upgrade procedure and/or when to start the software upgrade procedure.

12. The server of claim 9, wherein the processor is further configured to initiate a resource discovery operation to the IOT terminal to detect whether the target upgrade mode is configured in the IOT terminal.

13. The server of claim 9, wherein the transceiver is further configured to send an upgrade package type to the IOT terminal for the IOT terminal to determine, based on the upgrade package type, the upgrade package priority, and service status information, to start the software upgrade procedure.

14. The server of claim 13, wherein the upgrade package type comprises one of a security type, a function type, a configuration type, or a general type.

15. The server of claim 9, wherein the transceiver is further configured to:
  obtain upgrade package priority information; and
  determine, based on the upgrade package priority information, the upgrade package priority.

16. A computer program product comprising computer-executable instructions that are stored on a non-transitory computer-readable storage medium and that, when executed by a processor, cause a server to:
  determine an internet of things (IOT) terminal is registered successfully, wherein an IOT system includes the IOT terminal and the server configured to perform cluster management on the IOT terminal;
  obtain an upgrade package;
  determine a target upgrade mode for the IOT terminal, wherein the target upgrade mode comprises a terminal-decided upgrade mode;
  send an upgrade package priority to the IOT terminal for the IOT terminal to determine, based on the upgrade package priority and service status information of a service in the IOT terminal, to start a software upgrade procedure, wherein the service status information comprises at least one of a service status or a service priority, and wherein the service status indicates an idle state or a non-upgrade state of the service;
  send the upgrade package to the IOT terminal; and
  perform, using the upgrade package, the software upgrade procedure of the IOT terminal based on the target upgrade mode.

17. The computer program product of claim 16, wherein the instructions, when executed by the processor, further cause the server to receive a configured upgrade mode from the IOT terminal, and wherein the terminal-decided upgrade mode is a mode in which the IOT terminal determines whether to start the software upgrade procedure and/or when to start the software upgrade procedure.

18. The computer program product of claim 16, wherein the instructions, when executed by the processor, further cause the server to initiate a resource discovery operation to the IOT terminal to detect whether the target upgrade mode is configured in the IOT terminal.

19. The computer program product of claim 16, wherein the instructions, when executed by the processor, further cause the server to send an upgrade package type to the IOT terminal, wherein the upgrade package type is for the IOT terminal to determine, based on the upgrade package type, the upgrade package priority, and the service status information, to start the software upgrade procedure.

20. The computer program product of claim 19, wherein the upgrade package type comprises one of a security type, a function type, a configuration type, or a general type.

* * * * *